(12) United States Patent
Noonan

(10) Patent No.: US 10,251,149 B2
(45) Date of Patent: Apr. 2, 2019

(54) METHOD AND SYSTEM FOR TRACKING AND DETERMINING A LOCATION OF A WIRELESS TRANSMISSION

(71) Applicant: BINJ Laboratories, INC., Scituate, MA (US)

(72) Inventor: Joseph S. Noonan, Scituate, MA (US)

(73) Assignee: BINJ Laboratories, Inc., Scituate, MA (US)

( * ) Notice: Subject to any disclaimer, the term of this patent is extended or adjusted under 35 U.S.C. 154(b) by 0 days.

(21) Appl. No.: 15/077,862

(22) Filed: Mar. 22, 2016

(65) Prior Publication Data

US 2017/0280411 A1 Sep. 28, 2017
US 2018/0027517 A9 Jan. 25, 2018

Related U.S. Application Data

(63) Continuation-in-part of application No. 13/567,086, filed on Aug. 5, 2012, now Pat. No. 9,332,520, which is a continuation of application No. 12/157,530, filed on Jun. 11, 2008, now Pat. No. 8,238,936, which is a continuation-in-part of application No. 11/457,786, filed on Jul. 14, 2006, now Pat. No. 8,078,190.

(51) Int. Cl.
*H04W 24/00* (2009.01)
*H04W 64/00* (2009.01)
*H04W 4/90* (2018.01)

(52) U.S. Cl.
CPC ............. *H04W 64/00* (2013.01); *H04W 4/90* (2018.02)

(58) Field of Classification Search
CPC ...................................................... H04W 64/00
See application file for complete search history.

(56) References Cited

U.S. PATENT DOCUMENTS

| | | | |
|---|---|---|---|
| 4,054,754 A | 10/1977 | Nicodemus | |
| 4,638,496 A | 1/1987 | Jensen | |
| 5,966,655 A | 10/1999 | Hardouin | |
| 6,205,189 B1 | 3/2001 | Ha | |
| 6,222,458 B1 | 4/2001 | Harris | |
| 6,343,212 B1 | 1/2002 | Weber | |
| 6,580,372 B1 | 6/2003 | Harris | |
| 6,765,492 B2 | 7/2004 | Harris | |
| 7,202,798 B2 | 4/2007 | Harris | |
| 9,332,520 B2 * | 5/2016 | Nadler | ................. H04W 64/00 |

(Continued)

*Primary Examiner* — Justin Y Lee
(74) *Attorney, Agent, or Firm* — Law Office of Carl Giordano, PC

(57) ABSTRACT

An apparatus for detecting and timing a transmitting device is disclosed. The device includes a receiving system receiving a signal containing at least a preamble code of a known length and at least one pulse within a receive window after the preamble code, a circuit receiving the at least one pulse comprising a zero-crossing circuit for indicting a zero-voltage crossing of the at least one pulse and a trigger device for latching the indication of zero-voltage crossing, and a ripple circuit counter, receiving the latched indication of said zero-voltage crossing and associating a time to the receipt of the latched indication. A system for detecting and locating a transmitting device is further disclosed. The system includes a plurality of sensor apparatus each determining a reception time of a signal and a processor for determining a location based on groups of the reception times

21 Claims, 16 Drawing Sheets

(56) References Cited

U.S. PATENT DOCUMENTS

| | | | |
|---|---|---|---|
| 2001/0036200 A1* | 11/2001 | Nelson | H04B 7/2668 |
| | | | 370/503 |
| 2001/0036821 A1* | 11/2001 | Gainsboro | H04M 3/2281 |
| | | | 455/410 |
| 2002/0011119 A1 | 1/2002 | Bignell | |
| 2002/0098850 A1 | 7/2002 | Akhteruzzaman | |
| 2004/0206112 A1 | 10/2004 | Mak | |
| 2004/0246139 A1 | 12/2004 | Harris | |
| 2006/0099968 A1 | 5/2006 | Harris | |
| 2006/0105758 A1 | 5/2006 | Maislos | |
| 2006/0111062 A1 | 5/2006 | Cunningham | |
| 2006/0160545 A1* | 7/2006 | Goren | G01S 1/026 |
| | | | 455/456.1 |

* cited by examiner

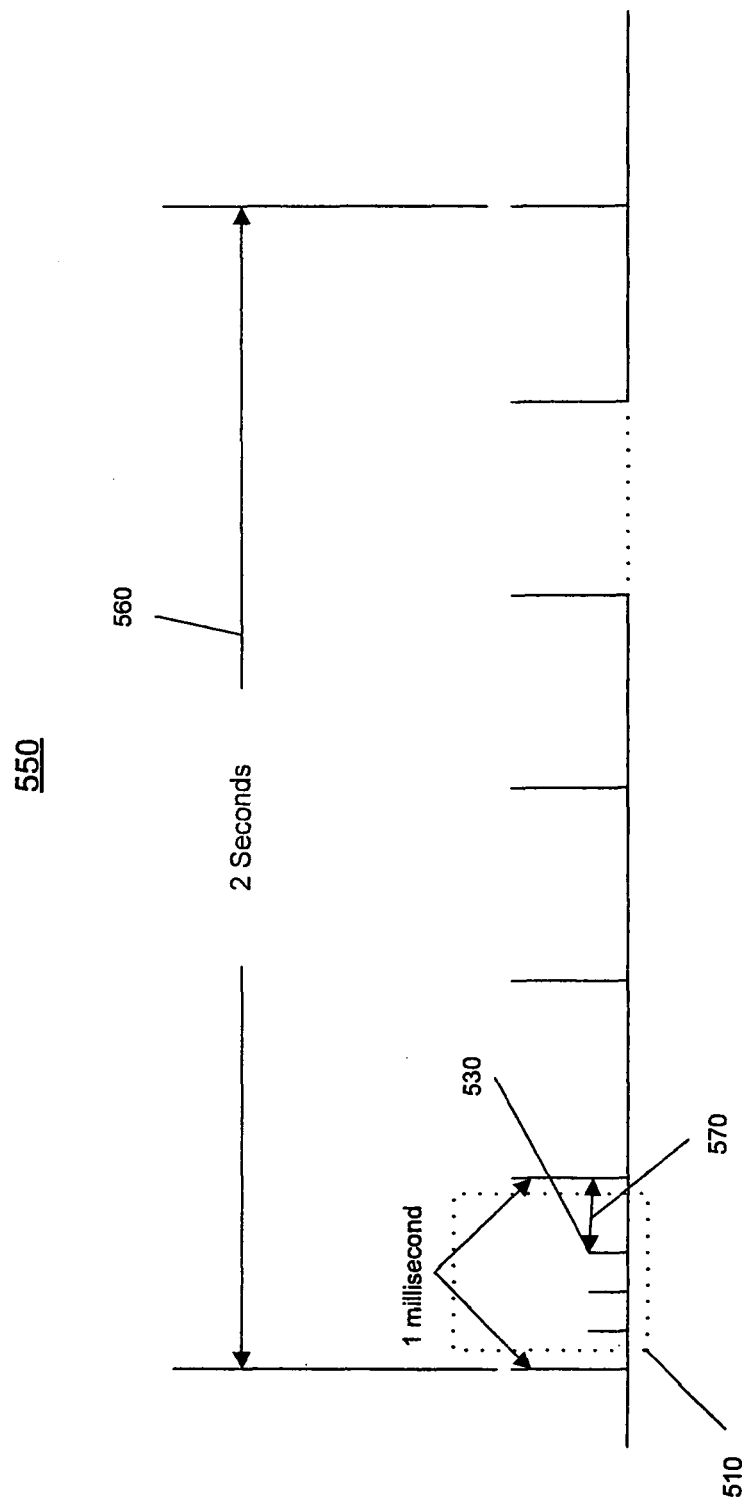

METHOD AND SYSTEM FOR TRACKING AND DETERMINING A LOCATION OF A WIRELESS TRANSMISSION

CLAIM OF PRIORITY

This application claims the benefit of the earlier filing date, pursuant to 35 USC 120, as a Continuation-in-Part of that patent application filed on Aug. 5, 2012and afforded Ser. No. 13/567,086, which claimed the benefit of the earlier filing data, pursuant to 35 USC 120, as a Continuation of that patent applications, filed on Jun. 11, 2008 and afforded Ser. No. 12/157,530, now U.S. Pat. No. 8,238,936, which claimed the benefit of the earlier filing date, pursuant to 35 USC 120 , as a Continuation-in-Part to that patent application entitled "System and Methods of Detection Transmission Facilities," filed on Jul. 14, 2006, and assigned Ser. No. 11/457,786, now U.S. Pat. No. 8,078,190, which claimed, pursuant to 35 USC 119, priority to US Provisional Patent application entitled "Signal Tracking and Identification Including Cell Phone Detection," filed on Nov. 23, 2005 and afforded Ser. No. 60/739,877 and U.S. Provisional Patent application entitled "Cell Phone Detection System," filed on Jul. 14, 2005 and afforded Ser. No. 60/699,281, the contents of all of which are incorporated by reference herein.

RELATED APPLICATION

This application is related to that patent application Ser No. 11/610493, entitled "Methods and Systems for High Speed Broadband Digital Link," filed on Dec. 13, 2006, and to that patent application entitled "Method and System for Tracking and Determining a Location of a Wireless Transmission, filed on Sept. 8, 2008 and afforded Ser. No. 12/231,437, the contents of which are incorporated by reference herein.

FIELD OF THE INVENTION

The present invention is related to the field of wireless communication and more particularly to a method and system for tracking and determining the location of a wireless transmission.

BACKGROUND OF THE INVENTION

There are many facilities, such as government buildings, schools and in particular correctional complexes, such as prisons, that do not permit wireless transmission (which is referred to herein as cellular phone usage) on the premises or even possession of cell phones on the premises. Preventing usage of such cell phones and other transmission facilities in such facilities/areas is of critical importance. For example, in government buildings, such as courts, cell phones usage is limited to prevent disturbances within the court room. In military facilities, cell phone use is limited to prevent the distribution of classified materials through a text or photographic feature of the cell phone. Cell phone usage in schools is limited to avoid distractions that may occur during the class session. And in prisons or correction facilities, cell phone usage is limited to maintain control of the population within the facility. Hence, detecting, tracking and determining the location of such unauthorized cell phone usage is important to each of these different types of facilities.

In other aspects, the use of wireless communication (cell phone usage and or other wireless transmission devices) is important in determining a location of the communication and the location of the person or object wearing such communication device. For example, in fighting a fire within a high-rise building, fire personnel may be distributed among a number of floors and there is a need to know their location, first, to better organize their fire fighting skills and second, and to provide direction for a safe exit in case of blockage to one or more of their egresses. Similarly, in a school situation, while student usage of cell phones may be prohibited, a wireless communication system may be useful to the student's parents in knowing that their child is actually in the school environment. Additionally, in a correctional environment the movement of staff, detainees, and equipment are critical to know the status and location of such staff, detainees and equipment.

Hence, there is a need for methods of detecting, identifying, tracking and locating wireless communication transmissions within facilities to limit regulate prevent, and/or monitor the ability to complete such wireless communication transmission.

SUMMARY OF THE INVENTION

An apparatus for detecting and timing a transmitting device is disclosed. The device includes a receiving system receiving a signal containing at least a preamble code of a known length and at least one pulse within a receive window after the preamble code, a circuit receiving the at least one pulse comprising a zero-crossing circuit for indicting a zero-voltage crossing of the at least one pulse and a trigger device for latching the indication of zero-voltage crossing, and a ripple circuit counter, receiving the latched indication of said zero-voltage crossing and associating a time to the receipt of the latched indication. A system for detecting and locating a transmitting device is further disclosed. The system includes a plurality of sensor apparatus each determining a reception time of a signal and a processor for determining a location based on groups of the reception times.

BRIEF DESCRIPTION OF THE DRAWINGS

For a better understanding of the invention, reference is now made to the drawings wherein:

FIGS. 5A and 5B illustrates exemplary message protocols in accordance with the principles of the invention;

Figure 1:
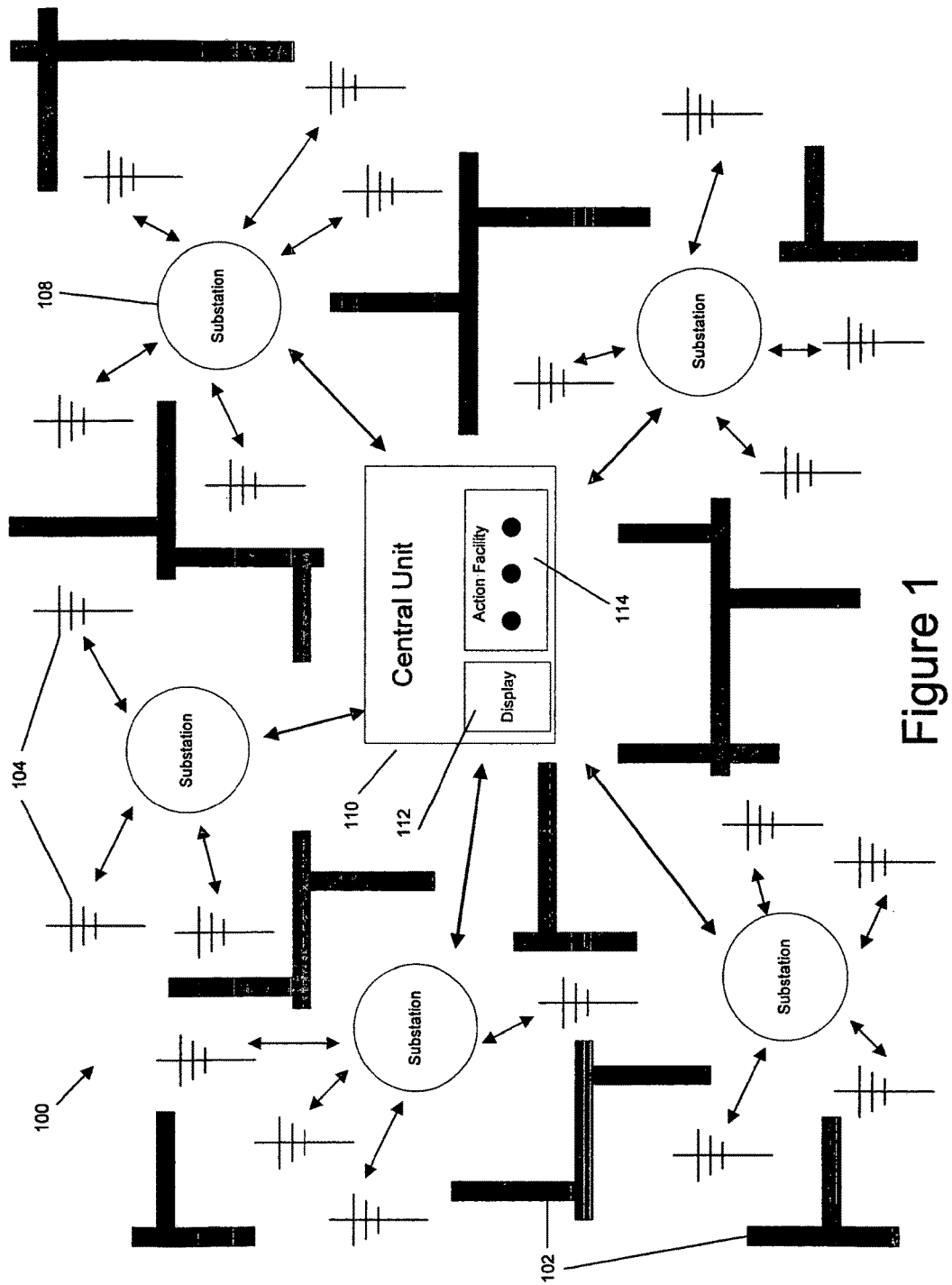
FIG. 1 illustrates a first exemplary application of a detecting, tracking, and locating system in accordance with the principle of the invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

Detection of a transmission facility, such as a mobile phone or hand-held radio transmitter, radio transceiver, or other wire transmission device as described herein, within an obstruction rich environment, such as a facility with many physical barriers to electronic transmission, is difficult to achieve. Similarly, the detection of a transmission outside a facility over great distances presents difficult challenges.

Figure 2:
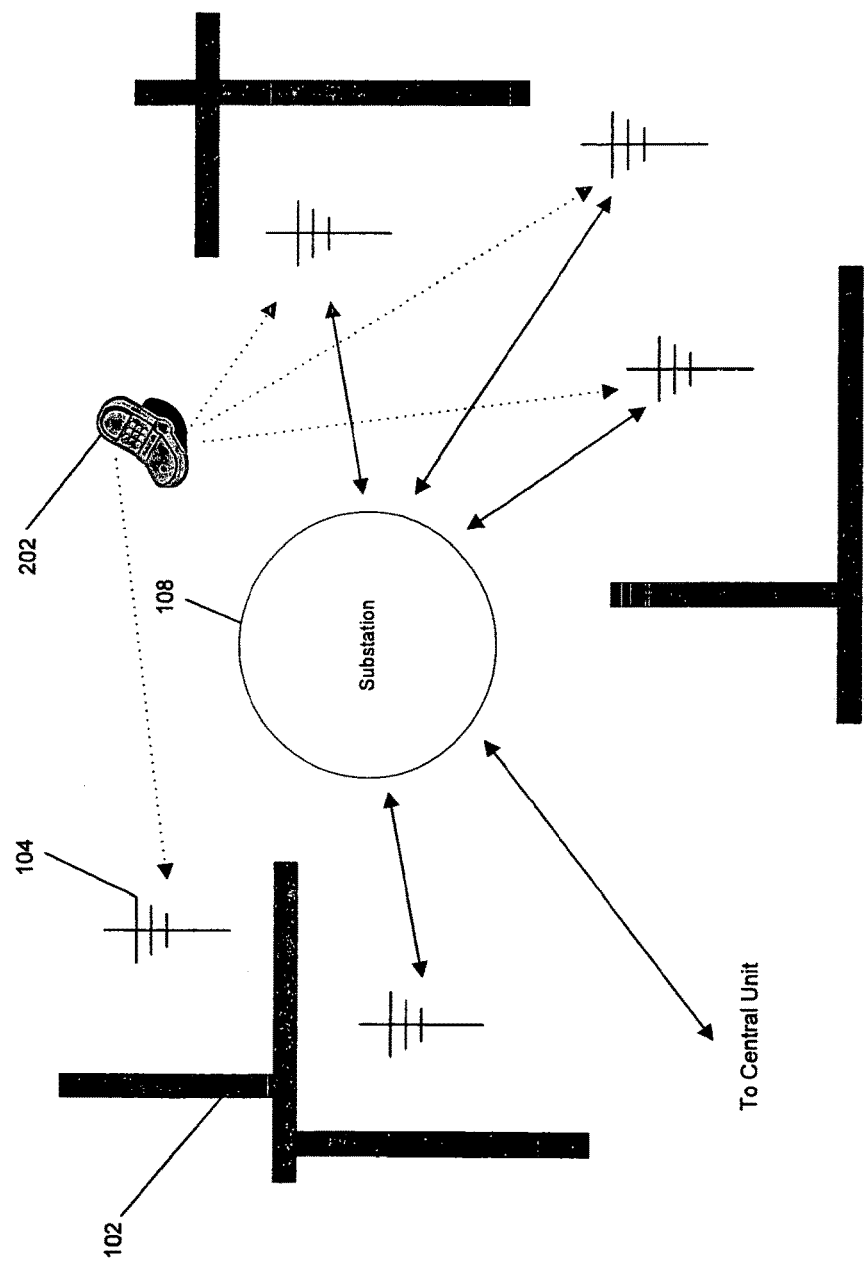
FIG. 2 illustrates one section of a detecting, tracking and locating system in accordance with the principles of the invention.

Referring to FIG. 1, the transmission detection, identification, and reporting system 100 described herein provides a method of detecting a transmission facility 202, such as depicted in FIG. 2, (not shown in FIG. 1) within an environment rich in obstructions 102. In this illustrated example, substation (or sensing device) 108 operates as an independent detection. One embodiment of the transmission detection, identification, and reporting system 100 may involve the detection of a mobile phone 202 within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility, cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

In embodiments, the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be a dipole antenna 104, a Yagi-Uda Log-Periodic antenna 104, a loop antenna 104, a quad antenna 104, a micro-strip antenna 104, a helical antenna 104, and a phase array antenna 104, a patch antenna or the like.

In embodiments, the transmission facility 202 may be a mobile phone, such as a flip phone, a slide phone, a cellular phone, a handset, a satellite phone, a 3 G phone, a wireless phone, a cordless phone, wireless transmission or the like. In embodiments, the transmission facility 202 may be a radio, such as a walkie-talkie, a mobile radio, a short-wave radio, or the like.

In embodiments, the transmission band from the transmission may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, a frequency suitable for 802.11x wireless communications, ultra wide band (UWB), Bluetooth, or the like. In embodiments, the transmission may be within the radio or other electromagnetic frequency spectrum and may include multiple radio and other electromagnetic frequency spectrum transmissions, performing multi functions.

In embodiments, the obstruction 102 rich environment may be a building, such as a corrections facility, a school, a government facility, a store, a mall, a residence, a hotel, a storage complex, a motel, or the like. In embodiments, the obstruction 102 rich environment may be a large confined space, such as a courtyard, a food court, a recess area, a hallway, greenhouse, recreation room, gymnasium, auditorium, kitchen, cafeteria, craft area, work area, library, prison yard, or the like. In embodiments, the obstruction may be a transmission, or device transmission obstruction, such as cinderblock, cement, rebar, wire cage, metal, metal coated surface, or the like. In embodiments, the obstruction 102 may be other construction materials, such as wood, glass, rug, flooring materials, roofing materials, and the like. In embodiments, antenna 104 may be placed a great distances from the area where the transmission facility is located, in that case, the obstruction to a transmission may be another building, rocks, trees or the like. In embodiments, the obstruction may be other construction materials, such as wood, glass, rug, flooring materials, roofing materials, and the like.

In embodiments, the transmitting signal information from the antenna 104 module to the central unit 110 may be through a communications connection, such as an IEEE 802.15.4, IEEE 802.11 a/b/g/n or coaxial cable, wireless network, wireless sensor to sensor (i.e., leapfrogging, hopping and repeater methodologies), IEEE 802.11 microwave, Wi-Fi, Bluetooth, Ethernet, or the and the like. In embodiments, the communications connection may utilize CAT-5, CAT-6, microwave, RJ-45, RS-232, coaxial cable connections, and the like. In embodiments the communications connection may utilize an optical connection, such as a wireless infrared link, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like and may transmit data sets such as text, video, data, images, and the like. The detection of the cell phones may be resolved down to cell phone manufacturer, EMEI, cell phone type, EMSI and cell phone provider and the like.

In embodiments, the transmitting signal information to the central unit 110 may be made through an intermediate connection, such as a substation 108, router, switch, hub, bridge, multiplexer, modem, network card, existing network, wireless hopping and leapfrogging meshed networks, network interface, processing unit, preprocessor, computer, repeater, antenna 104, and the like. In embodiments, the transmitting signal information to the central unit may encompass video and audio data and protocols and may include 3$^{rd}$ party network traffic, TCP/IP or other protocol information and the like. In embodiments, the transmitting signal information to the central unit may be sent through internal and external network systems and the like.

In embodiments, the central unit 110 may have in part a computer, a computer system, a network of computers, a state machine, a sequencer, a microprocessor, a digital signal processor, an audio processor, a preprocessor, a microprocessor, microcontroller, and the like.

In embodiments, the central unit 110 may process information, such as data information, educational information, identification information, audio, video information, environmental (water, heat, toxins), proximity information and the like, emergency information, such as, biometric information, alert and danger information and the like, location information, such as the location of people, inmates, corrections personnel, visitors, all personnel within the facility, equipment, cell phones, wireless devices, resources, weapons, products, incoming goods, outgoing goods, movement information, such as speed, direction, height and the like. In embodiments, the information may be the identification of the transmission facility wearer. The information may be the type of signal, such as mobile phone standard protocols such as WiMax, CDMA, CDPA, GSM, TDMA, IS-95, and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned and the like. In embodiments, the processed information may include other near area transmission facility information with unique identifiers assigned and the like.

In embodiments, the central unit 110 may have a display 112, such as a cathode ray tube (CRT), liquid crystal display 112 (LCD), electronic paper, 3D display 112, head-mounted display 112, projector, segmented display 112, computer display 112, graphic output display 112, and the like. In embodiments, the central unit 110 may have an action facility 114, comprising a user interface for causing actions relating to the detected transmission facility 202, such as closing a door, sealing a room, deploying and action signal, initiating an alarm, and the like. In embodiments, the central unit 110 may have an action facility 114, comprising an interfacing unit that interfaces with existing networks or processes which utilize the information that may be generated by one or more of the embodiments described herein.

In embodiments the functions of a central unit 110 as described, herein, may be replaced by an alternate configuration, such as a configuration of multiple computers, such as a group of servers, processors, or the like, operating in parallel. In embodiments the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, magnetic field strength, amplitude, time, or a combination of these; or by identifying and locating an area associated with an antenna 104 with the highest signal strength. In embodiments, the location of a transmission facility 202 may be determined by various radiolocation or signal measurement techniques, including measuring phase, amplitude, time, or a combination of these; or by identifying and locating an area associated with other transmission facility. In embodiments, the location of a transmission facility 202 may be determined by a transceiver transmission facility 202 which includes a location sensing, such GPS, or by another transmission facility 202 containing proximity sensor, e.g., capacitive coupling, or detecting sensor, e.g., Bluetooth or other similar short range wireless detection device. In embodiments, the location of a transmission facility 202 may be determined when the transmission facility 202 is powered off though detection of a null in the band pass of a transmitted frequency sweep due to the presence of a mobile phone antenna. In embodiments, the location of a transmission facility 202 may be determined by measurement techniques, including measuring resistance, a null in the band pass, impedance, electrometric field, near field technology radio frequency radiation methodologies, or a combination of these; or by identifying and locating an area associated with other transmission facility.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated with a microprocessor with results output to a display 112. A database of these signatures can be placed into the device, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power and/or changing sensitivity.

Radiolocation, also referred to as radio-determination, as used herein encompasses any process of finding the location of a transmitter by means of the propagation properties of waves. The angle at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (iix) location based on proximity to known locations (including locations of other radio-transmitters), (ix) map-based location, or any combination of any of the foregoing, as well as other location facilities known to those of skill in the art.

Obstructions to radio wave propagation may greatly reduce the effectiveness of many of the conventional radio-location methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. Additionally, by employing an array of antennas 104, positioned to detect transmission facility 202 locations wherein the receiving antennas 104 are obstructed in such manner that line-of-sight is prevented, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, trilateration, multilateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of Sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction rich environment 102, presents an ideal example of how the transmission detection, identification, and reporting system 100 may significantly increase the detection of transmission facilities 202 such as mobile phones a significant challenge to authorities of the correction facilities. In this embodiment, the system may be placed throughout the corrections facility for the purpose of alerting the corrections staff that cell phone activity is taking place, the time of the activity, the location of the activity and the type of device or service i.e., Nextel, T-Mobile, Verizon, and the like. In another example of an embodiment of the transmission detection, identification, and reporting system 100 may be placed on the perimeter of a selected area for the purpose of alerting school officials, neighborhood watch programs, homeland security personnel and/or law enforcement that cell phone and/or transmission facility movement and/or activity is taking place, within the perimeter of the area covered. The time of the activity, the location of the activity and the type, i.e., transmission facility identification, such as, Nextel, T-Mobile, Verizon, and the like, may also be determined and provided. A further embodiment of the system suitable for school safety includes the identification of all cell phone usage within the facility. In this embodiment, the integration with a CCTV apparatus, with positional coordinates, the transmission facility and the sensor array nodes have audio, video surveillance capability with biometric and alert technologies, such as bomb detection, bio-hazards, prohibited substances detection and the like. In an embodiment of the transmission detection, identification, and reporting system 100 may also direct other types of transmission detection, identification, and reporting system 100 to focus on a specific transmission facility and the like. In an embodiment of the transmission detection, identification, and reporting system 100 may provide energy conservation methodologies, such as idle mode and the like, to reduce the power requirements of battery or solar powered equipments. The technologies described herein may also allow for standalone detection units incorporated in a transmission facility or a set of detection units to detect transmission devices in schools, buildings and other environments in which the facility's or area's provider does not wish the use of cell phones and is interested in the detection of cell phone use.

Figure 3:
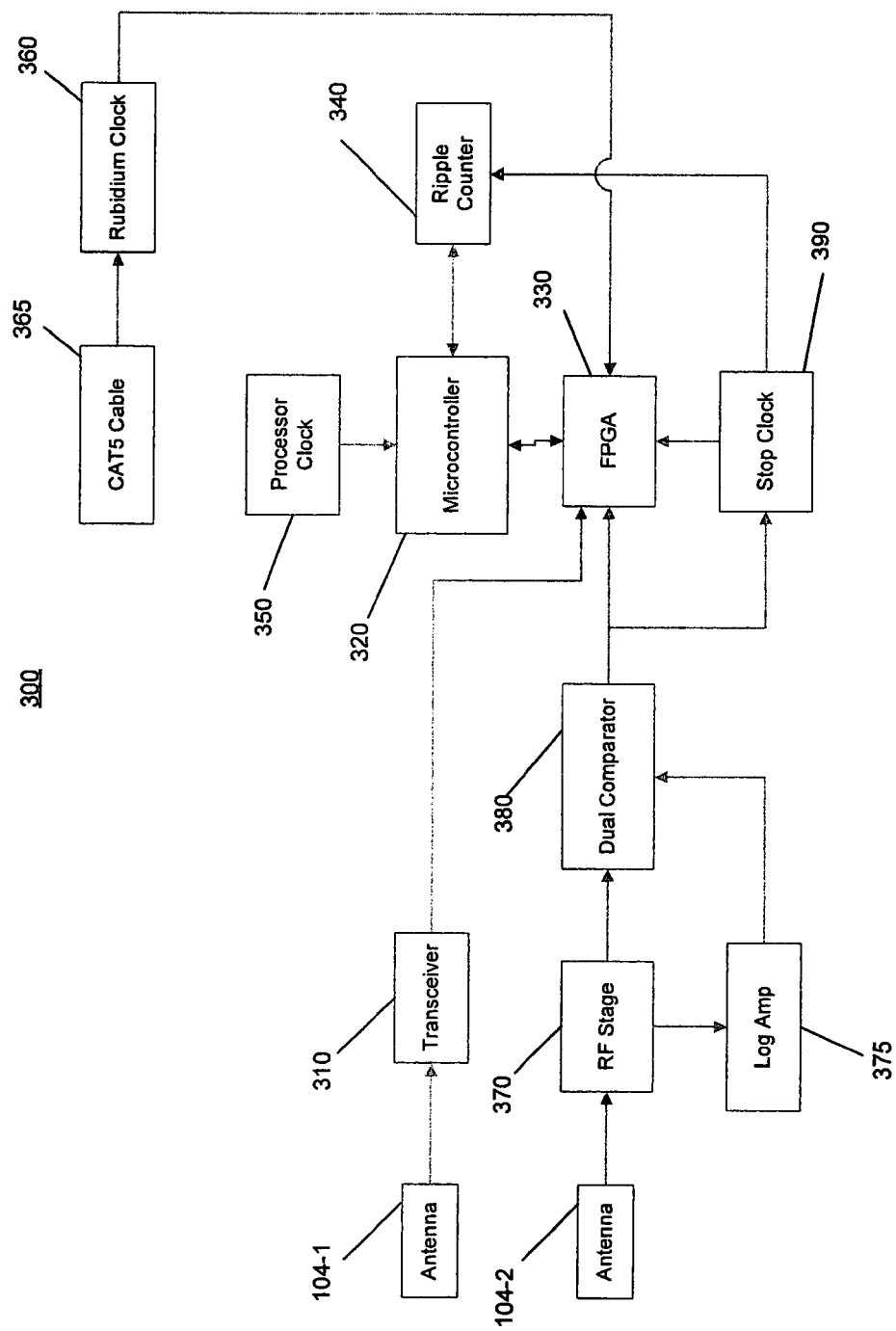
FIG. 3 illustrates a block diagram of a sensor apparatus in accordance with the principles of the invention.

FIG. 3 illustrates a high-level block diagram of an exemplary sensing system in accordance with the principles of the invention. In this illustrated embodiment, antenna 104-1 receives low power data signals from a transmission facility or wireless transmission device (not shown). The data signal is provided to transceiver (transmitter/receiver) 310 that down-converts the data signal and provides the data signal to processor 330. In this case, processor 330 is implemented as Field Programmable Gate Array (FPGA). Processor 330 may similarly be presented as a general purpose processor unit (e.g., or microprocessor 320) or an Application Specific Integrated Circuit (ASIC).

Antenna 104-2 receives a Radio Frequency (RF) signal and provides the RF signal to RF stage 370 for down-converting and amplification. The down-converted signal is then applied to a "log" amplifier 375. Log amplifiers are known in the art to provide a gain value to a received signal based on the magnitude of the received signal. In this case, the gain is applied according to a logarithmic function rather than a linear function. The output of RF stage 370 and log amplifier 375 are applied to a dual comparator 380.

One output of the dual comparator 380 is applied to FPGA 330 and one output is applied to a stop clock circuit 390, which determines a time when a designated received pulse is detected. FPGA 330 provides an enable signal to the stop clock circuit 390. An output of the stop clock circuit 390 is applied to a ripple circuit, which maintains an accurate time to determine a accurate time when the designated received pulse is detected.

Also shown is a high-accuracy clock 360 that provides a clock signal to FPGA 330. Preferably, clock 360 is a rubidium clock having a measurement accuracy in the order of picoseconds. The rubidium clock 360 may be connected to a dedicated category 6 cable that allows for allowing connection of one or more devices requiring a high-accuracy clock signal.

Processor clock/FPGA clocks 350 are provided to the respective devices for the internal operation of these devices. The processor clock and FPGA clock signals may be generated independently.

Figure 4:
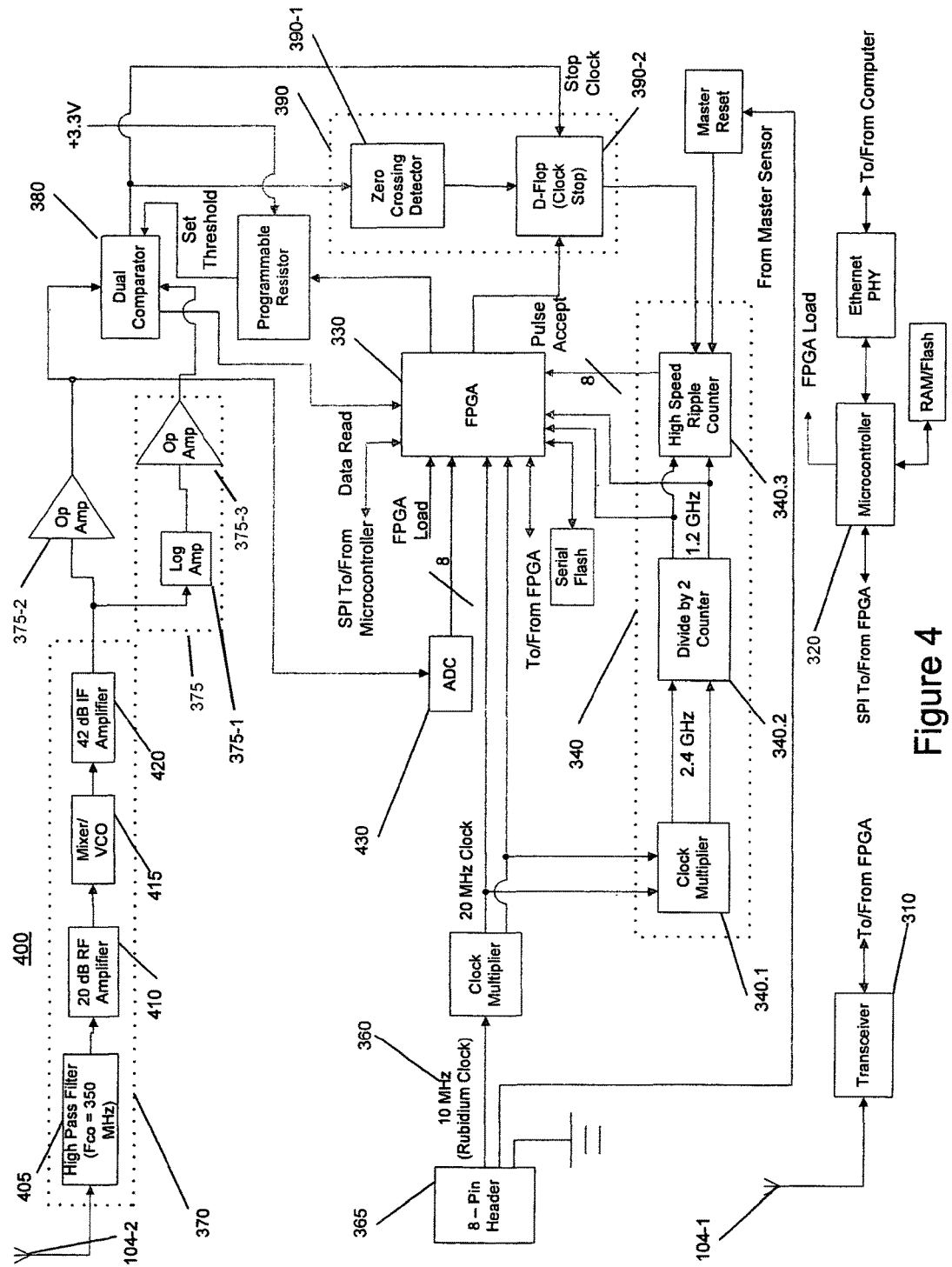
FIG. 4 illustrates a second block diagram of a sensor apparatus in accordance with the principles of the invention.

FIG. 4 illustrates a further detailed block diagram implementation f a sensing system in accordance with the principles of the invention. In illustrated embodiment, antenna 104-1 receives a data signal, as previously described, and applies the received signal to transceiver 310. The output of transceiver 310 is applied to FPGA 330. In one aspect of the invention, the data signal is transmitted on a carrier frequency of 434 Mhz. Antenna 104-2 receives a signal and applies the received signal to RF stage 370. RF stage 370 is composed of a low-pass filter 405 to remove high frequency signals, a 20 db (decibel) amplifier 410 to amplify the remaining received signal, a mixer 415 to down-convert the received signal to a known baseband signal and a second amplifier 420 to amplify the baseband signal. The output of the RF stage 370 is applied to log amplifier 375 and operational amplifier 375-2. Log amplifier 375 is composed of log amplifier 375-1 and operational amplifier 375-3. Log amplifier 375-1 amplifies the received signal based on a logarithmic function, as previous described, and operational amplifier 375-2 amplifies the received signal based on a linear function.

The output of the operational amplifier 375-2 is applied to a Analog/Digital Converter 430 that digitizes the received signal, which is then applied to FPGA 330. In addition, the output of each of the log amplifier 375 and the operational amplifier 375-2 is applied to a dual comparator 380, which compares the applied inputs to known threshold values to reduce spurious signals. The log amplifier signal and the operational amplifier are each applied to the FGPA 330 and the output of the operational amplifier is further applied to a stop clock circuit 390. Stop clock circuit 390 is composed of a zero-crossing circuit 390-1 and a trigger device 390-2 (e.g., a D-flip flop). Zero-crossing circuit 390-1 are known in the art to provide an indication when a modulation of a signal crosses a zero-voltage value. The zero-crossing indication is then provided to trigger circuit 390-2 which provides a digital representation of the zero-crossing.

The digital representation output of the clock stop circuit is next applied to the ripple counter circuit 340. In this illustrated embodiment, ripple counter circuit 340 is composed of a clock multiplier 340.1 that multiples a clock signal received from FPGA 330. The multiplied clock is provided to a divide by two circuit 340.2 to reduce the clock rate. The reduced clock rate is applied to a ripple counter 340.3. In this illustrated case, the ripple counter 340.3 provides a signal to FPGA 330 when a stop clock signal is received from stop clock circuit 390.

In a preferred embodiment, a 160 MHz clock is provided to clock multiplier 340.1 which produces a clock rate of 2.4 GHz. The 2.4 GHz clock is divided to a clock rate of 1.2 GHz to operate ripple counter 340.3 The output of the divide by two device is presented to the FPGA 330, representing the most significant bit, prior to the ripple counter. In this case the ripple counter 340.3 operates in the order of nanosecond resolution. Although, the clock rate is shown as being increased and then decreased, this is merely a function of an implementation and is not to be considered the only means of generating a clock signal or that the clock is limited to a 2.4 GHz signal.

FPGA 330 receives a ripple counter value associated with stop clock indication. The ripple counter value represents a time value, which in conjunction with similar ripple counter values may be used to determine a location of a cell phone or similar transmitting device, as is described with regard to FIGS. 7A-7B.

Figure 5A:
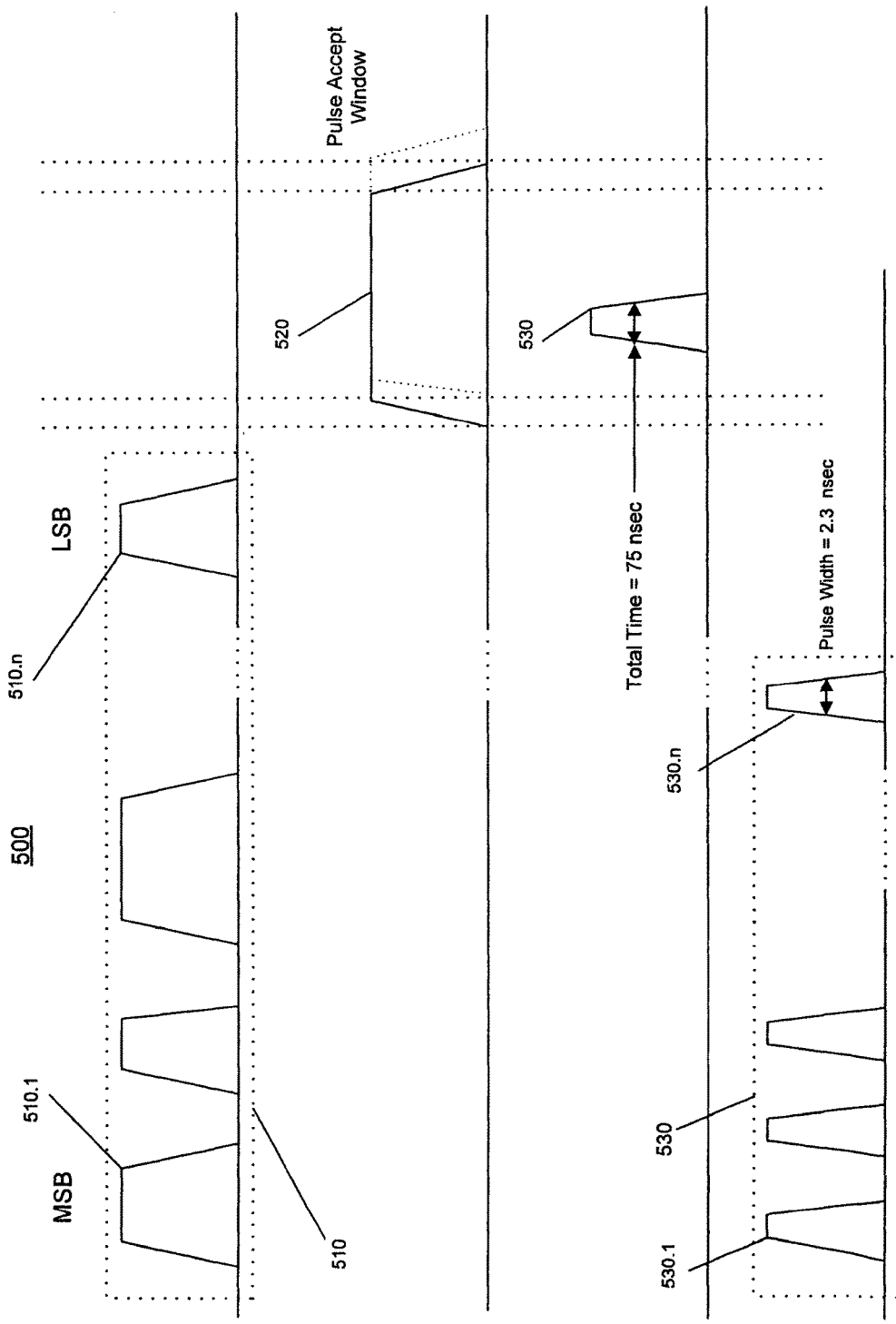

FIG. 5A illustrates an exemplary message protocol in accordance with the principles of the invention. In this exemplary message, a preamble message 510 is composed of a plurality of data bits represented as 510.1-510.$n$. Each of the data bits 510.1-510.$n$ may represent one or more additional bits. For the purposes of describing the principles of the invention, each illustrated data bit 510.1-510.$n$ represents a single data bit. The preamble message may represent an identification of a user, a characteristic of a user, biometric data of a user or combinations thereof. Preamble 510 further represents a marker and a trigger that identifies the beginning of the reception of a transmission of a particular user. In one aspect of the invention the number of bits in preamble 510 is fixed at sixteen (16). However, it would be recognized that the number of preamble bits may be selected based on desired transmission characteristics and have been contemplated and considered within the scope of the invention described herein.

After reception of a number of known preamble bits 510.1-510.$n$, a pulse projection window 520 is open for a known period of time to capture the occurrence of a next pulse 530 in the pulse sequence. This next pulse is referred to as clock stop pulse. The clock stop pulse is used to accurately determine end of transmission as described with regard to FIG. 4. Clock stop pulse 530 is further composed of a plurality of individual pulses 530.1-530.$n$, that are distributed among the clock stop pulse. The detection of at least one pulse 530.1-530.$n$ satisfying at least one known criterion is used as a time marker to mark the end of transmission from a user.

In one aspect of the invention, the preamble pulses are selected as being of a duration of 71 nanoseconds uniformly distributed over a 1.136 microsecond time frame. The pulse window is established as 50 nanoseconds and each of the pulses 530.1-530.$n$ within clock stop pulse 530 are represented as 32 pulses of a 2.2 nanosecond duration. It would be recognized that the preamble described herein is representative of a single aspect of the invention and that the particular values described herein are provided to not limit the scope of the invention to this value.

FIG. 5B illustrates an exemplary Time Division Multiple Access (TDMA) protocol 550 in accordance with the principles of the invention. In this exemplary protocol, each user is assigned a time slot in which a user may transmit a message to a sensor or substation (see FIG. 1) by the central office. The time slot assignment may be established dynamically by the central office 110 or substation 108 based on the number of users within a general range of the central office. In another aspect, each of the users may have allocated a predetermined time slot and when the user enters a general area managed by the central office or substation, the central office 110 or substation 108 may register the user and determine whether conflicts may exist. Conflict resolution may for example be resolved by incorporating a CDMA (Code Division Multiple Access) protocol (not shown) on each of the conflicting users. In this case, two users may thus transmit in the same time slot by the central office assigning and providing a known code to each of the conflicting users. CDMA technology is well known in the art and need not be discussed in detail herein.

In the illustrated protocol shown, each user is allocated a one millisecond (1 ms) time slot (or a time slot which varies from 500 microseconds to 20 milliseconds) in which to communicate with a sensor. That is, the preamble 510 is received substantially at the beginning of the time window, as each user is synchronized to the time frame 560. The stop clock bit 530, when received marks the end of the reception of the user preamble, which may include identification information. The remaining time 570, in the time slot, may be utilized for the transmission of additional information, e.g., type of device, biometric data, text data, voice data, etc., to the central office or substation. For example, the biometric data may include information such as heart rate, pulse rate, temperature or with appropriate placement of one or more transmitting devices, an electrocardiogram.

In this illustrated example, the time frame 560 is selected as two (2) seconds to accommodate up to 2000 users, without CDMA encoding. However, it would be recognized that the time slot and/or time period may be adjusted based on the type and number of expected users within the system. For example, in critical situations, the time period may be adjusted to a smaller value to provide faster updates of the location of a user. As would be recognized, synchronization of the wireless transmission devices with respect to the frame is performed periodically to insure the correct time relationship between the wireless devices and the frame.

Figure 6:
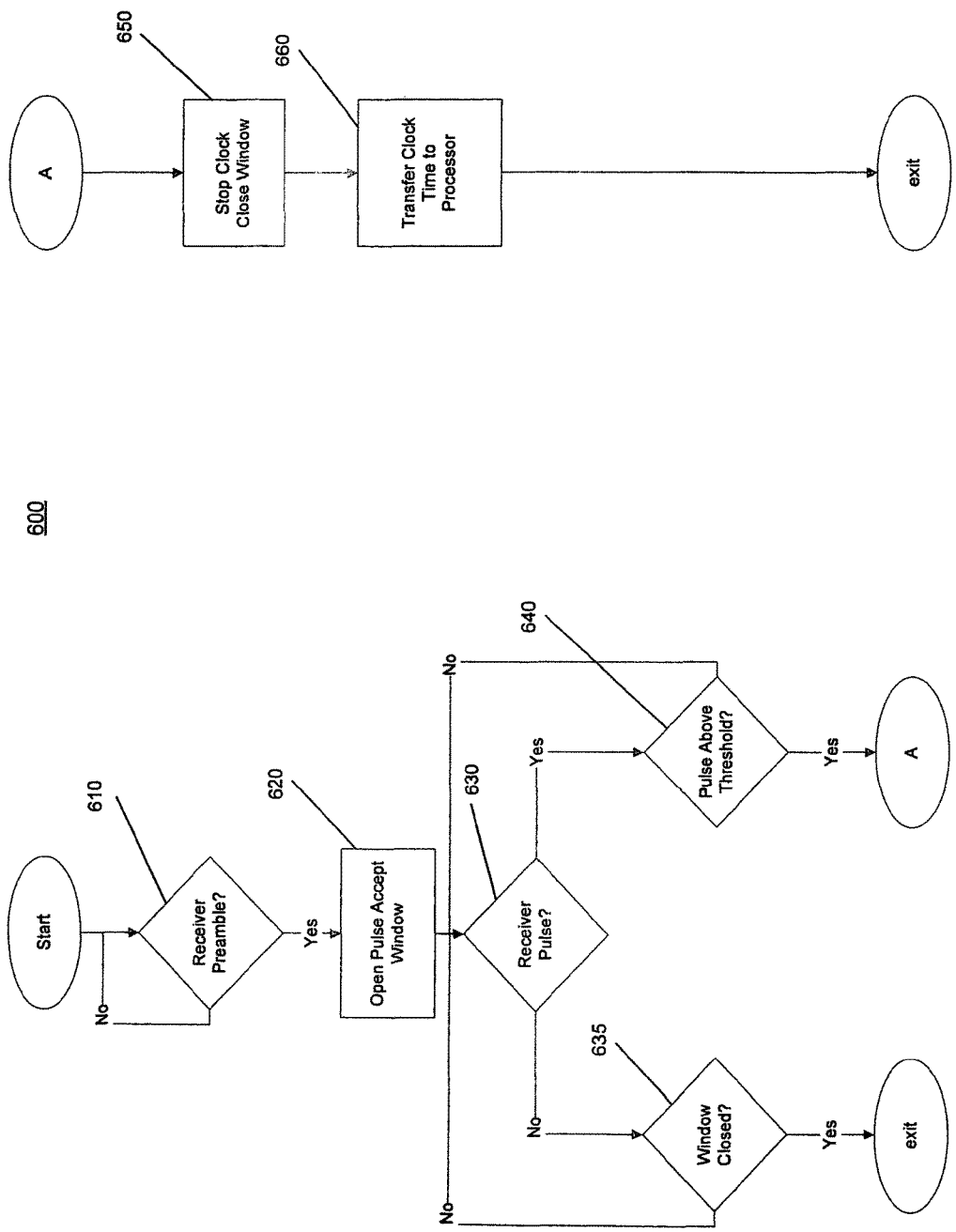
FIG. 6 illustrates an exemplary process for identifying wireless communication systems in accordance with the principles of the invention.

FIG. 6 illustrates a flow chart of an exemplary process 600 for determining a time of receiving information from a user in accordance with the principles of the invention. In this exemplary process 600, a sensor is turned on to accept an assigned user identification during a selected time slot (not shown). A determination is made at block 610 whether the preamble (510, FIG. 5A) is received. If the answer is negative, then processing continues to test the receipt of the preamble.

This process is performed until the time slot expires and a new identification is searched for.

However, when the preamble is received, a time projection window is opened at block 620. At block 630, a determination is made whether the stop clock pulse (530, FIG. 5A) is received. In this case, a reference to clock stop pulse 530, any of the clock stop sub pulses 530.1-530.$n$, may be used to indicate that the clock stop pulse 530 has been received.

If the answer is negative, then a determination is made whether the time of the window has expired. If the time of the projection window has not expired, then processing continues to monitor whether the stop clock pulse has been received (block 630).

However, if the clock stop pulse (or at least one of the clock stop sub pulses 530.1-530.$n$,) is received, then a determination is made whether a measured amplitude of the received clock stop pulse is above a threshold value at block 640. If the amplitude is below the threshold value then processing continues to monitor for a received pulse at block 630.

However, if the measured amplitude is above a threshold value then processing continues at block 650, wherein a stop clock indication (e.g., time) is made wherein the time of the received pulse is determined and the projection window is closed. The time of the received stop clock indication is provided to a processor at block 660 for further analysis.

Although not shown, it would be appreciated that the threshold value may be determined dynamically based, for example, on an average of the measure amplitude of each of the received pulses in the preamble 510. In another aspect, the threshold value may be determined based on the measured amplitude value of those pulses in the preamble that lie within a known level with regard to the maximum amplitude value. In either aspect, the threshold value may then be determined as being a known level below the measured amplitude of the preamble pulses. In still another aspect, the threshold value may be set at being a known level above and below the measured amplitude to the preamble pulses. For example, a threshold value may be established as 1 decibel (db) above and below a measured amplitude of the pulses in the preamble. In this example, a pulse is only accepted when it is detected during the projected window (temporal criterion) and within an amplitude range (amplitude consistency criterion).

Figure 7A:
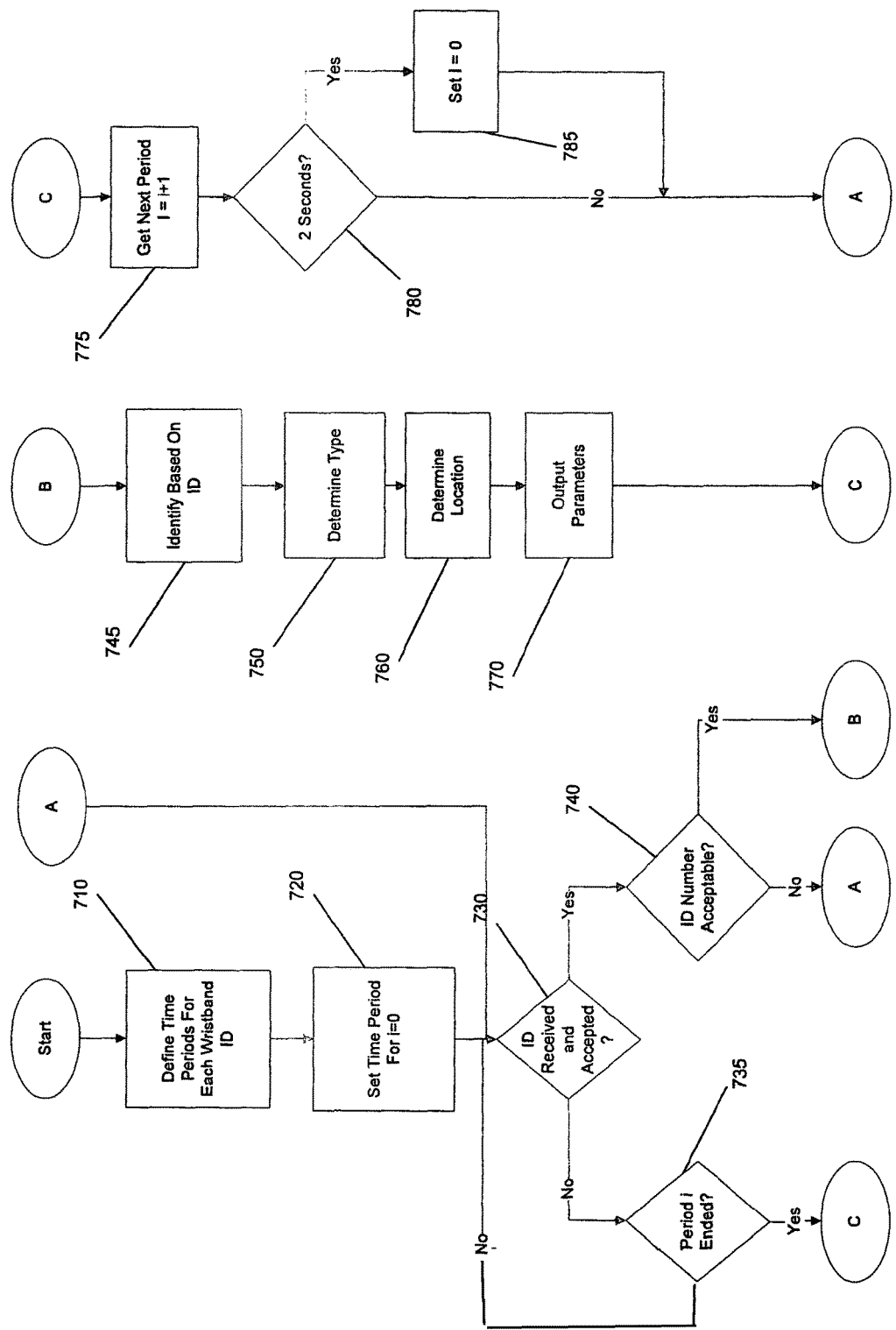
FIG. 7A illustrates an exemplary process for tracking a wireless communication in accordance with the principles of the invention.

FIG. 7A illustrates a flow chart of an exemplary process 700 for determining a location of a wireless transmission in accordance with the principles of the invention. In this illustrated embodiment, time slots are assigned to each user in a network at block 710. As previously discussed, this assignment may be based on the number of users, a time frame and a time slot length. At block 720, an index is set for each time slot within a time frame. At block 730 a determination is made whether an identification associated with the user assigned to the time slot has been received. As previously discussed, this identification may be included within the preamble that is received during the time slot (see FIG. 5B). If the identification has not been received then a determination is made at block 735 whether the time slot has ended. If the answer is negative, the processing continues at block 730.

However, if the identification has been received, then a determination is made whether the identification is associated with the designated time slot at block 740. If the answer is negative, the processing continues at block 730 to wait the correct identification.

However, if the identification is acceptable, then the user is identified based on the identification at block 745, the type of device may be determined at block 750 and a location may be determined at block 760, using triangulation techniques, as previously discussed. At block 770, the parameters associated with the user may then be output to a display device, for example.

Returning to block 735, if the time period associated with the time slot expires, then processing continues at block 775 wherein a next time period is selected. At block 780, a determination is made whether all the time slots in the frame have been scanned. If the answer is in the affirmative, then the value associated with the time slot is reset to repeat the processing at the beginning at the time frame.

Although not shown, it would be appreciated that processing of identification and/or determination of type of device in blocks 745 and 750, respectively, may be performed prior to accepting the identification in block 740. Similarly, the determination of the acceptable identification may be removed without altering the scope of the invention.

Figure 7B:
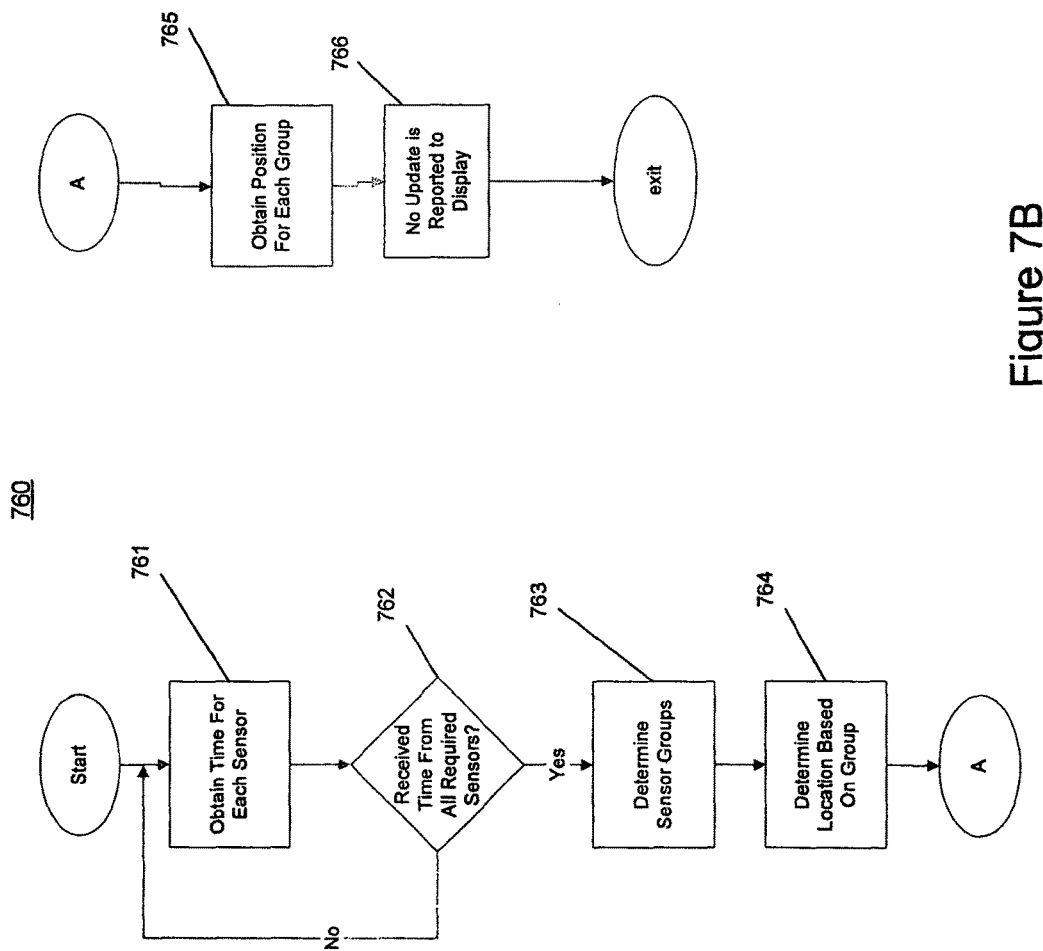
FIG. 7B illustrates an exemplary process for locating a wireless transmission in accordance with the principles of the invention.

FIG. 7B illustrates a flow chart of exemplary process 760 (see FIG. 7A) for determining a location or position of a transmitting facility in accordance with the principles of the invention. In this illustrated embodiment, a time value is obtained from each of the sensors within the network at block 761. At block 762 a determination is made whether a sufficient number of time values have been obtained. If the answer is positive, then groups of times are formed at block 763, wherein each group includes selected ones of the time values. At block 764 a position or location is determined based on each group of times. In one aspect of the invention, the location based on a group of times may be determined using a linear algebra based algorithm. The linear algebra based algorithm is well known in the art and need not be described herein.

At block 765 each of the positions obtained from the groups of times is obtained and at block 766 a final position is determined as a function of the obtained positions. For example, a final position may be determined as an average of the obtained positions. In another aspect, selected ones of the obtained positions may be used for determining a final position.

As an example, when six (6) sensors are included in the system, with times designated at $T_1$-$T_6$, two groups of times ($T_1$-$T_5$ and $T_2$-$T_6$) may be formed and a position obtained for each of these two groups. While a position may be determined based on at least three time values within a group in a horizontal plane, in a preferred embodiment of the invention at least five (5) time values within each group are utilized. The use of five time values is preferable to account for vertical displacement of the transmitting facility and it has been found the use of five time values converges to a solution faster than four time values.

Figure 8A:
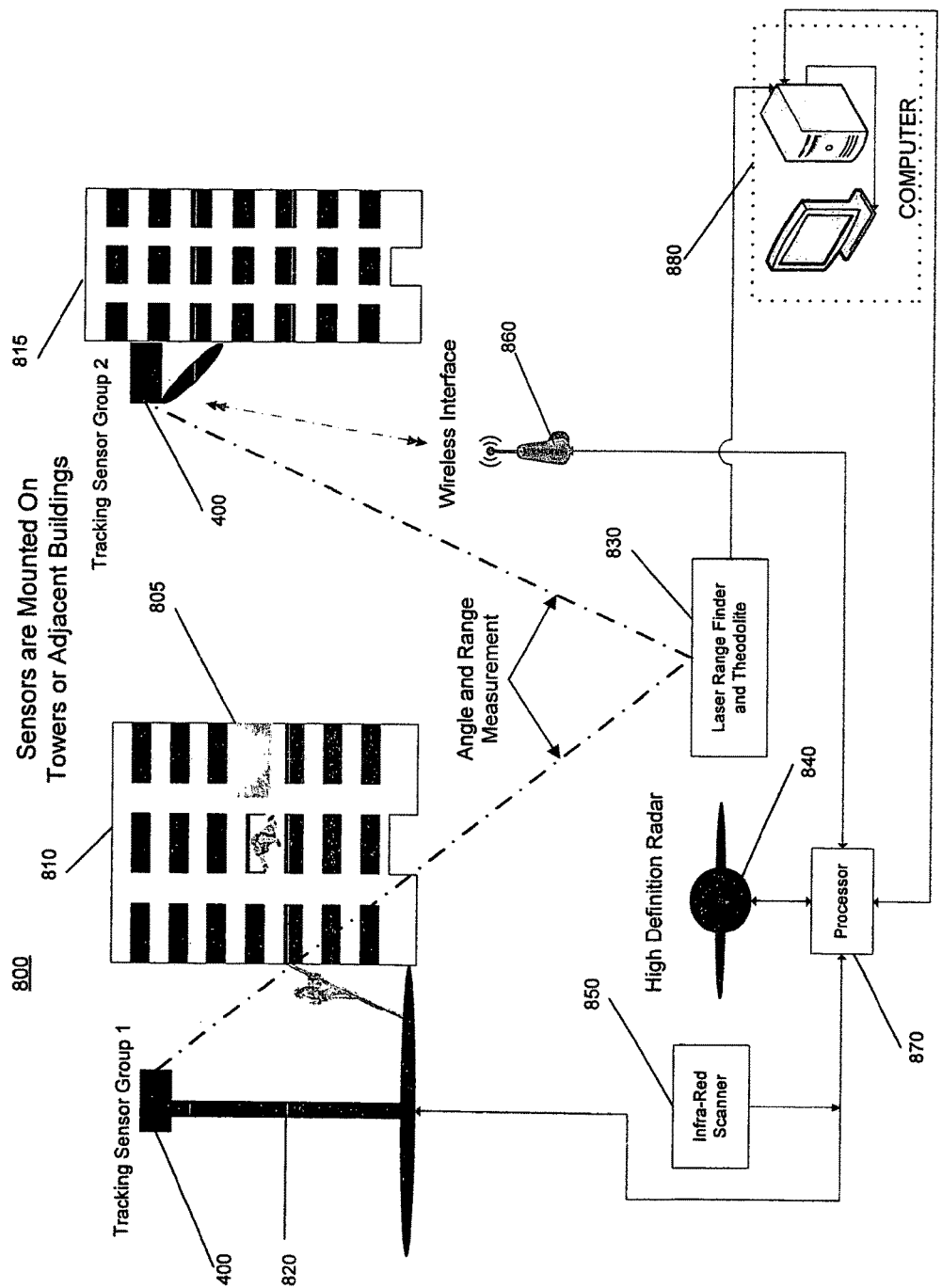
FIGS. 8A-8C illustrates further exemplary applications of the detecting, tracking, and locating system in accordance with the principles of the invention.

FIG. 8A illustrates an exemplary application of the system described herein. In this exemplary application, which is associated with a fire fighting situation, of identifying, monitoring, tracking and locating a fire fighter 805 located in building 810.

In this illustrated exemplary application, one or more sensors 400 may be located on building 815 or a tower 820 adjacent to the building 810. In one aspect of the invention, the location of the sensors may be built into command vehicles, wherein, the sensors may be placed in a configuration that provides for best determining location of the firefighter. The fire fighter 805 may have on his/her person a wireless transmission device, e.g., a cell phone or a special purpose device. The special purpose device may be a transceiving device (wireless device) that may be attached to a wrist (a wrist band), pinned to a garment or attached around a neck (a badge). The wireless transmission device may further provide emergency notification capability incorporation (i.e., alarm alert, panic button, audio communication capability, biometric information, altitude and attitude indication). The wireless transmission device may be preloaded with an identification code or the identification code may be dynamically assigned and downloaded to the wireless transmitting device at the moment the device is needed. Thus, the location of each of the firefighters 805 may then be monitored, tracked and located as previously disclosed as the sensors 400 provide identification of firefighter 805 via a wireless communication link to wireless interface 860. Computer 880 may then correlate the information from each of the sensors to determine a location of firefighter 805.

Although the principles of the invention are applicable to the illustrated example, it would be recognized that in this dynamic situation, the location of the sensors are not determined a priori nor is the general configuration of the building 810 known. Hence, to provide proper location of firefighter 805 locations of sensors 400 and a general layout of the building 810 is needed. To determine the location of the sensors a laser range finder and theodolite 830 may be used. The theodolite may determine the position, both horizontally and vertically with respect to the position of the theodolite. The position of the theodolite may be determined based on a GPS (Global Positioning Satellite) system. In one aspect, the sensors 400 may also include a GPS receiver, which may provide the location of the sensor 400 via a wireless communication link to interface 860. In addition, a high definition RADAR 840 may be used to map the interior elements of building 810. This mapping may be performed periodically to account for changes in the structure of building 810. The information from the RADAR 840 may be provided to a processor 870 that correlates the location of firefighter 805 with the current structure of building 810. It would be recognized that such correlation may be performed in computer 880 also. In another aspect, an infrared scanner 850 may be incorporated to determine the location of hot spots within building 810. In this illustrated system 800, computer 880 may for example, direct a firefighter 805 toward or away from hot spots depending upon the situation that is occurring within building 810.

Figure 8B:
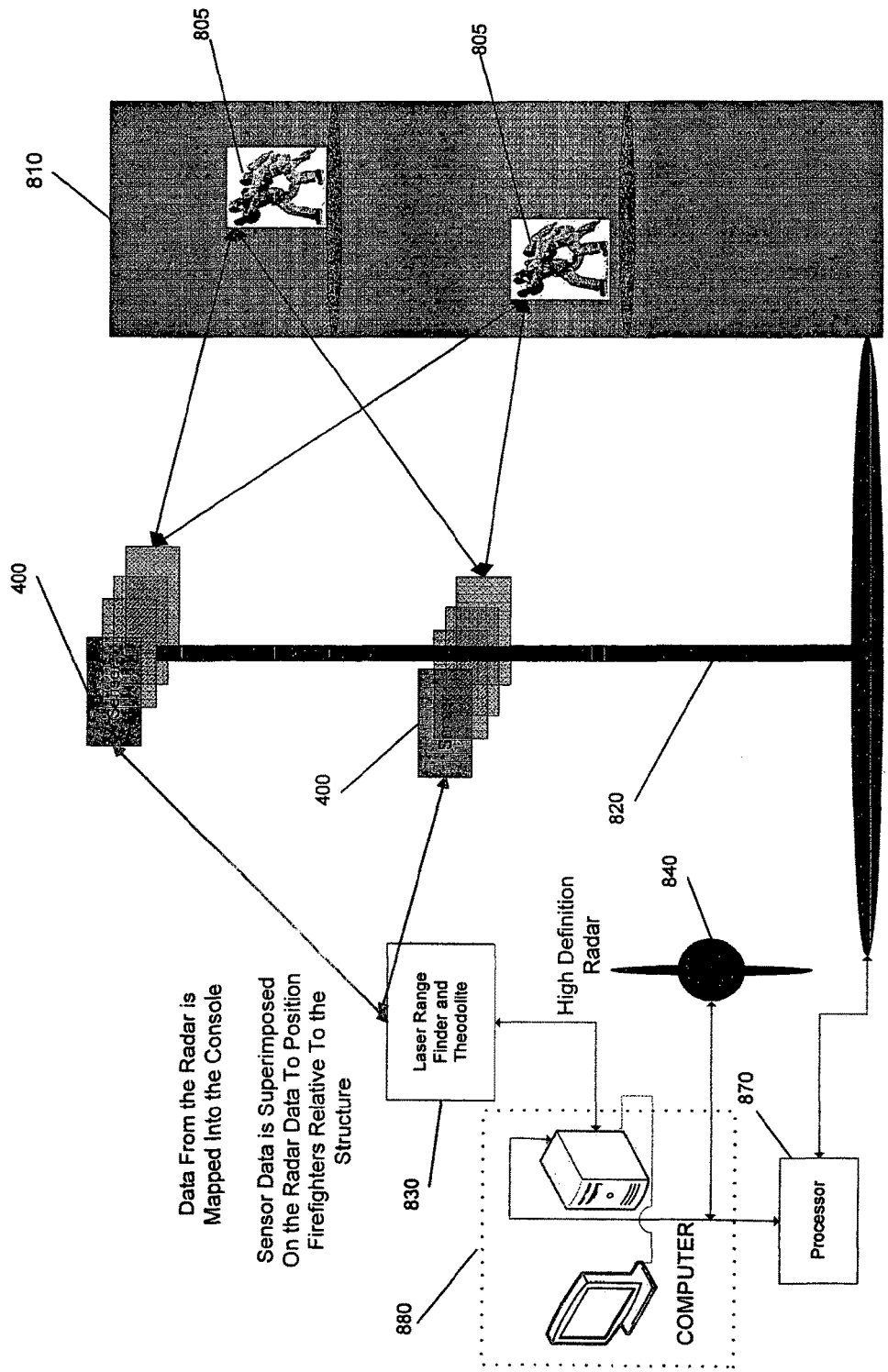

FIG. 8B illustrates another exemplary application of the system described herein. In this exemplary application, multiple sensors 400 are positioned vertically on tower 820 to provide accurate location of each of the firefighters on different levels within building 810. Computer system 880, as previously discussed, may correlate the interior structure of each floor of building 810 to accurately locate the position of firefighter 805.

Figure 8C:
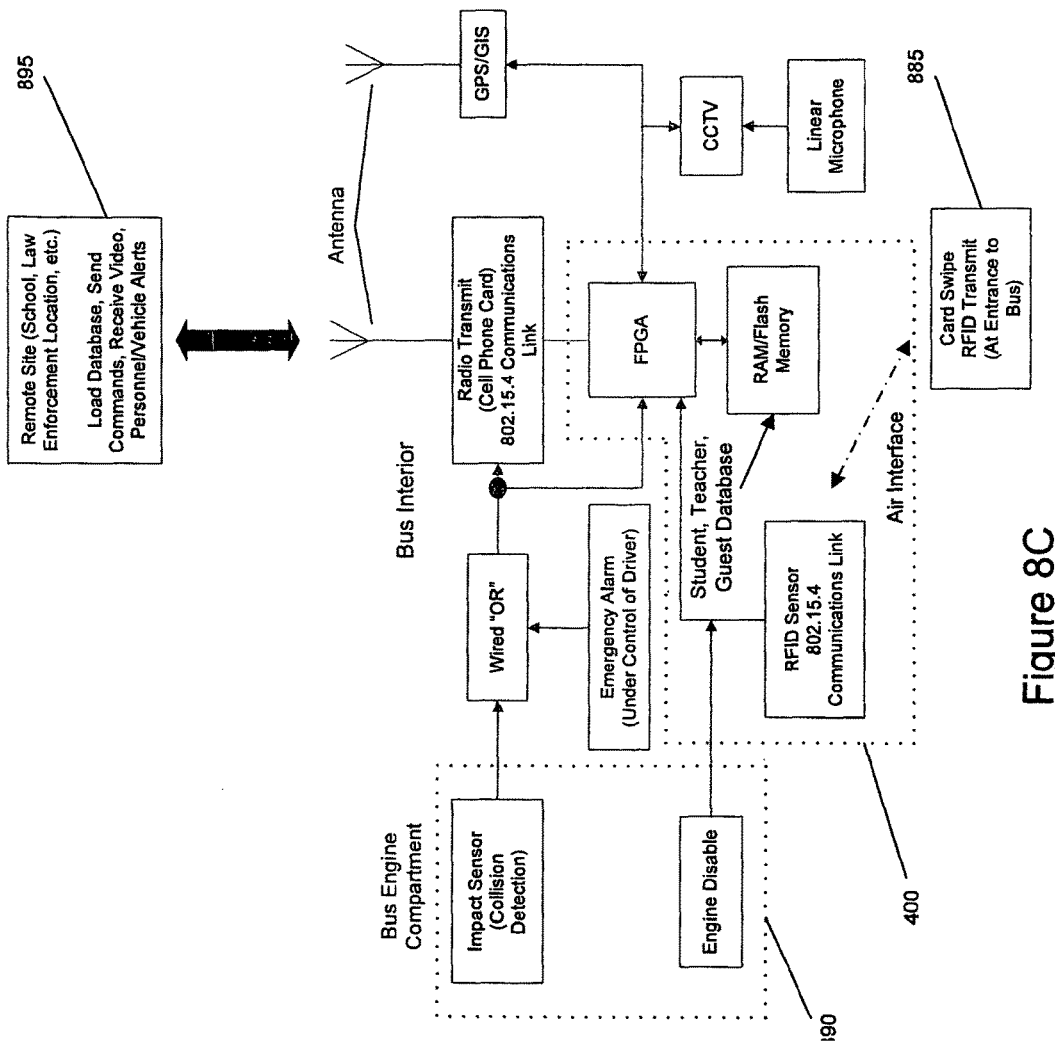

FIG. 8C illustrates another exemplary application of the system described herein. In this exemplary application, sensor 400 may be included on a school bus, for example, wherein each student is allocated a badge 885 that is detected upon the students entry to the bus. Detection and identification is performed in a manner as shown in FIG. 7B. The identification and status of each person (student, parent, driver) may then be provided to central office 895 that maintains a register of the persons on the school bus. In the case of an accident, for example, information regarding the bus may be determined by collision or impact sensor 890 and provided to the central office 895. The central office having a registration of the persons on the bus may then provide information to parents, school officials, and police. In this aspect of the invention, the bus itself may include a long-range wireless transmitting device (previously discussed) or transmission facility (as earlier discussed for outside applications) or a GPS system (not shown) that determines the location of the bus.

Figure 9:
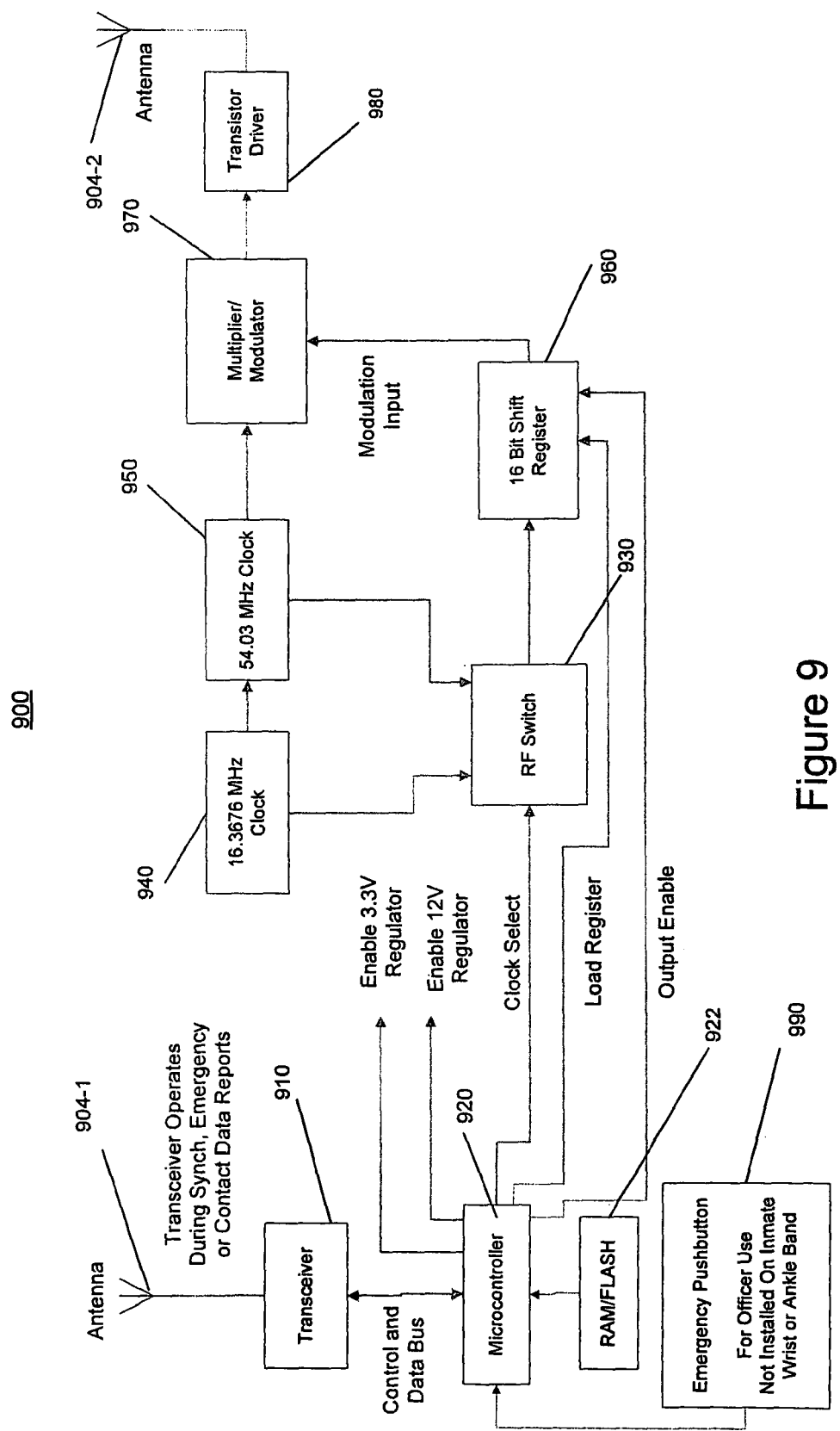
FIG. 9 illustrates a block diagram of an exemplary remote device in accordance with the principles of the invention.

FIG. 9 illustrates a block diagram of an exemplary wireless transmission device 900 in accordance with the principles of the invention. In this illustrated exemplary, device 900 includes antenna 904-1 receiving a signal from sensor 400 (not shown). The signal may include a synchronization pulse, an identification code, and/or a time slot indication within a frame allocated to the device. The provided signal is down converted by transceiver 910 and the signal is applied to microcontroller 920. Microcontroller 920 may be in communication with memory 922, which may include instructions or code for controlling the processing of microcontroller 920. Memory 922 may also be preloaded with an identification code or provide storage for information received from sensor 400. Processor 920, when active during the allocated time slot, may provide control to shift register 960 to cause the output of the preamble message (see FIGS. 5A and 5B) in the allocated time slot. The preamble bits are next provided to a modulator 970 to modulate a carrier signal (in this case 448 MHz). The modulated carrier is then provided to driver 980 for transmission via antenna 904-2.

Processor 920 further provides instruction to shift register 960 to output a clock stop pulse and a 56 MHz bit rate data package. In a preferred embodiment, the clock stop pulse is of a known duration and is not modulated by modulator 970.

RF switch 930 controls an input to shift register 960 in allowing one of a preamble signal, a clock stop signal or a data signal to be applied to shift register 960. Crystal clock 940 and multiplier 950 are used to generate a clock signal suitable for the pulse duration of the preamble bits. (see FIG. 5A). An emergency signal mode may further be incorporated as represented by block 990. In this case, a known emergency signal may be transmitted within the preamble code or in the data section (see FIG. 5B). This emergency signal may override other data that may be transmitted during this time period.

Figure 10:
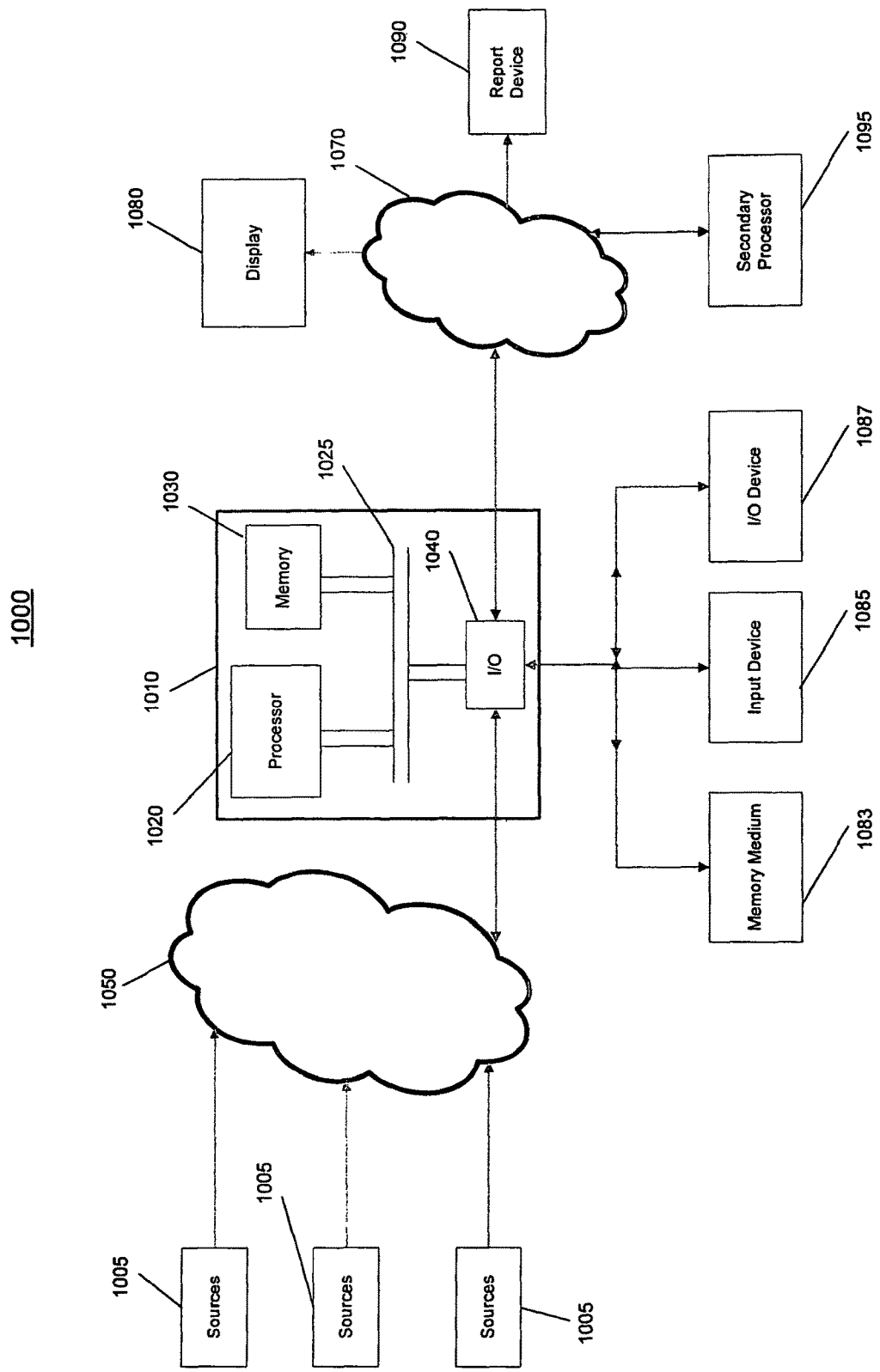
FIG. 10 illustrates a system for implementing the system in accordance with the principles of the invention.

FIG. 10 illustrates a system 1000 for implementing the principles of the invention as depicted in the exemplary processing shown herein. In this exemplary system embodiment 1000, input data is received from sources 1005 over network 1050 and is processed in accordance with one or more programs, either software or firmware, executed by processing system 1010. The results of processing system 1010 may then be transmitted over network 1070 for viewing on display 1080, reporting device 1090 and/or a second processing system 1095.

Processing system 1010 includes one or more input/output devices 1040 that receive data from the illustrated sources or devices 1005 over network 1050. The received data is then applied to processor 1020, which is in communication with input/output device 1040 and memory 1030. Input/output devices 1040, processor 1020 and memory 1030 may communicate over a communication medium 1025. Communication medium 1025 may represent a communication network, e.g., ISA, PCI, PCMCIA bus, one or more internal connections of a circuit, circuit card or other device, as well as portions and combinations of these and other communication media.

Processing system 1010 and/or processor 1020 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 1020 may be a central processing unit (CPU) or dedicated hardware/software, such as a PAL, ASIC, FGPA, operable to execute computer instruction code or a combination of code and logical operations. In one embodiment, processor 1020 may include code which, when executed by the processor, performs the operations illustrated herein. The code may be contained in memory 1030, may be read or downloaded from a memory medium such as a CD-ROM or floppy disk, represented as 1083, may be provided by a manual input device 1085, such as a keyboard or a keypad entry, or may be read from a magnetic or optical medium (not shown) or via a second I/O device 1087 when needed. Information items provided by devices 1083, 1085, 1087 may be accessible to processor 1020 through input/output device 1040, as shown. Further, the data received by input/output device 1040 may be immediately accessible by processor 1020 or may be stored in memory 1030. Processor 1020 may further provide the results of the processing to display 1080, recording device 1090 or a second processing unit 1095.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, microchannel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 1010 may also be in two-way communication with each of the sources 1005. Processing system 1010 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1050 and 1070 may also be internal networks or one or more internal connections of a circuit, circuit card or other device, as well as portions and combinations of these and other communication media or an external network, e.g., the Internet and Intranet.

Aspect of the invention, which are applicable in the fields of corrections, law enforcement and in society in general have contemplated the convergence of a plurality of technologies. In this case, the sensors may perform multi functions, as they may communicate both in a wired and wireless mode. The communications may be setup to work in a Wide Area Network (WAN) or a closed loop network, with known wireless protocols and access points. The sensors can detect multiple wireless transmissions, including those from conventional cell phone, and wrist bands, badges and transmission facility units, as described herein. The wrist bands can pass and receive audio, biometric, video, data and information to and from the sensors, and receive wireless communication and data/information from other wristbands and pass information and receive information to at least one $3^{rd}$ party application or device. The wrist bands transmission capability includes, sync, transceiver communication, and pico-second rise-time transmission circuit, and a battery conservation circuit. The wristband includes at least one $3^{rd}$ party application or device and incorporates biometric, identification, alarm and alert functionality and circuitry. The sensors can also pass audio and video to a central unit, or receive wireless communication from each other sensor and pass that information to at least one $3^{rd}$ party application or device. Additionally, the central unit may accept data from the $3^{rd}$ party network and pass the data to the sensors to be broadcast out each node. An embodiment of the system is to provide communication to each cell, wherein a user can receive and transmit audio video data, and phone services. The sensors are also designed to connect to smoke detector and other alarm detection devices, for example. The central interface, transmission detection, identification, and reporting system 100, and transmission facility, may be designed to communicate and integrate with existing systems and new CJIS compliant systems, via built-in active, passive radio technology (i.e., offender management systems, commissary systems, medical records systems, inmate telephone systems, scheduling software, etc.) may be provided by the methods described herein.

The embodiment and central unit is designed to collect data on at least a portion of the wireless transmissions including time, status, biometric, environmental and location and the like. The embodiment of the system may dissect this information to make better decisions regarding on the environment within the sensor range of the sensors. In this case, conditions such as heart attack detection, suicide prevention, and stress analysis may be detected and provided to a central office. The transmission facility central interface, transmission detection, identification, and reporting system 100, embodiment can adjust its transmission, and/or sensitivity to conform to the building and/or outside environment. The control unit is designed to be stand alone or be able to handle multi-facility (buildings) coordination and display.

In one aspect of the invention, each of a plurality of persons (e.g., inmates, correction personal, firefighter, police, etc.) may be equipped with one or more transmitting devices. For example, transmission devices may be incorporated in wristbands, belts, badges or other wearable items. Each of the transmission devices may be assigned a code that identifies the transmission device. For example, a code for a badge may be assigned a code that is comparable to the number assigned to the badge. Or the badge may be assigned a code that represents a unique value independent of the number assigned to the badge. Furthermore, the codes assigned to one or more transmission devices may be related. For example, the codes assigned to two transmission devices assigned to a same person may possess a unique identification code which defines the device, while having a further identification associated with the specific person. The assigned code may thus be represented as a single code value obtained as a concatenation of the two codes or a hash of the two codes. In this case, a unique code may be used to identify the device and the associated person. The use of two transmission devices is advantageous in situations, as will be discussed.

In accordance with the principles of the invention, at least one sensor may be fixedly or temporarily established around or within a designed area. Each of the at least one sensors may include one or more of an active transmitter and a receiver configuration. The active transmitter may transmit, periodically, synchronization signal into the designed area. The synchronization signal provides a trigger signal for each of the transmission devices within the designated area, as previously discussed. The time between the transmissions of the synchronization signal is referred to as a time frame. Each of the transmission devices may be assigned a preamble code that defines the device, and a time slot within the time frame. The preamble code may further define the assigned time slot within the time frame. The time frame, the duration of the time slot and the number of time slots may be determined based on a number of transmission devices to be monitored within the designated area. In addition, the number of transmission devices that may be monitored may be further increased without increasing the time frame using modulation techniques such as CDMA within each time slot.

As previously discussed, each transmission device in response to the reception of the synchronization signal transmits, within its assigned time slot, the assigned preamble code and the stop clock pulse and at least its identification code. In addition, biometric data may be transmitted. For example, heart rate may be transmitted within the allocated time slot.

As previously discussed, the sensor receiver configuration detects (receives) the transmission from a corresponding transmission device within the designated area. The sensor provides the received information to a processor for determining a location of the transmission devices and, in the case, of two devices, validating the user within the designated area.

In one aspect of the invention, when at least two devices are assigned a same person, the detection of response signal from less than a majority of the devices assigned to the same person may indicate the existence of an abnormal condition. For example, if the two devices are located at a substantially distance from each other, then the devices may not be in the possession of the same person. In this case, an alarm signal may be generated that notifies one or more additional personal of the potential alarm system. For example, if a transmission device is assigned to a weapon and the location of the weapon is determined to be significantly different than the person to whom the weapon is assigned may indicate a serious error.

In accordance with the principles of the invention, the time of detection of the response transmission from each of the transmission devices may be determined as previously discussed using the stop pulse generated a predetermined time after the end of the preamble code.

In one aspect of the invention the transmission devices may communicate with each other to authenticate the presence of two devices that are substantially adjacent to each other. In one aspect of the invention, the transmission devices may include, in addition to a local area wireless communication transmitting system (e.g., cellular communication, WiFi communication, etc.), a short range communication system (e.g., a Near-Field Communication (NFC), BLUETOOTH, etc.).

In accordance with the principles of the invention, one or more second receiving systems may be positioned around or within the designated area. The second receiving system may be configured to detect event transmissions that occur within the designated area. For example, an event transmission may represent a generation of a fire alarm signal or an emergency condition signal. The second receiving system may further be configured to detect an event transmission associated with a wireless transmission that may be associated with mobile devices, such as cellular phones, smart phones, etc. The event transmission in this case may be a voice and/or data (e.g., text) communication.

In accordance with the principles of the invention, the one or more second receiving system may detect the event transmission and provide information regarding the detected event transmission to a central unit that includes a processing system. The processing system may determine a location of the event transmission and correlate the location of the event transmission with a location of each person associated with a transmission device within an area surrounding the location of the event transmission.

In accordance with the principles of the invention, information regarding the event transmission may then be provided to each of the persons within an area surrounding the location of the event transmission. For example, if the event transmission is a fire alarm, each person within an area associated with the fire alarm may be informed of the fire alarm. In addition, each person may be provided with information regarding a best route to avoid the first alarm. Similarly, the processing system may provide information regarding the event transmission and the persons affected by the event transmission to a display unit and one or more first responding agencies in order to provide assistance in a timely manner. In addition, the first responding agencies may be provided with information regarding the number of persons affected by the event causing the event transmission. Additionally, one or more persons associated with the identified persons may be informed of the occurrence of an event and the location of persons within an area surrounding the event.

In one aspect of the invention, when the event transmission is associated with cellular or WiFi communications, at least one second system detecting the transmission provides information regarding the detected transmission to the processing system. The information provided may include a time of detection of the transmission in addition to characteristics of the detected transmission (e.g., transmission frequency, type of transmission, signal strength, etc.). The processing system may correlate the detected transmission with at least one person within the designated area. In addition, a location of the detected transmission may be determined based on the detected transmission. For example, location may be determined based on an amplitude of the detected transmission received on at least one second receiving system. Or may be determined based on a time of arrival of the detected transmission at one or more receiving systems.

In accordance with the principles of the invention, a determination may be made regarding whether the detected transmission (i.e., cellular communication, Wi-Fi communication, VoIP communication) is allowed to continue transmission. Based on the identification of a device (e.g., a cell phone) associated with the detected transmission and an identity of a user associated with the identified cell phone, continued transmission of the cell phone may be allowed or not allowed. For example, when the device associated with the detected transmission is positively correlated with a user within the area and the user is identified as being authorized within the area, transmissions may continue to be allowed from the area. However, if the device associated with the detected transmission is positively correlated with a user within the area and is user is identified as not being authorized to operate within the area, further communication may be denied or directed to a channel that prevents subsequent communication. Similarly, if the device associated with the detected transmission is positively correlated with a user within the area but a location of the device is significantly different than the location of the user, further communication may be denied or directed to a channel that prevents subsequent communication.

In one aspect of the invention, a second transmitting system may be positioned to transmit information within one or more areas within the designated area. The second transmitting system may provide information, such as educational information, to selected persons within the designated area. The education information may be selected based on a number of persons that have similar educational needs.

Figure 11:
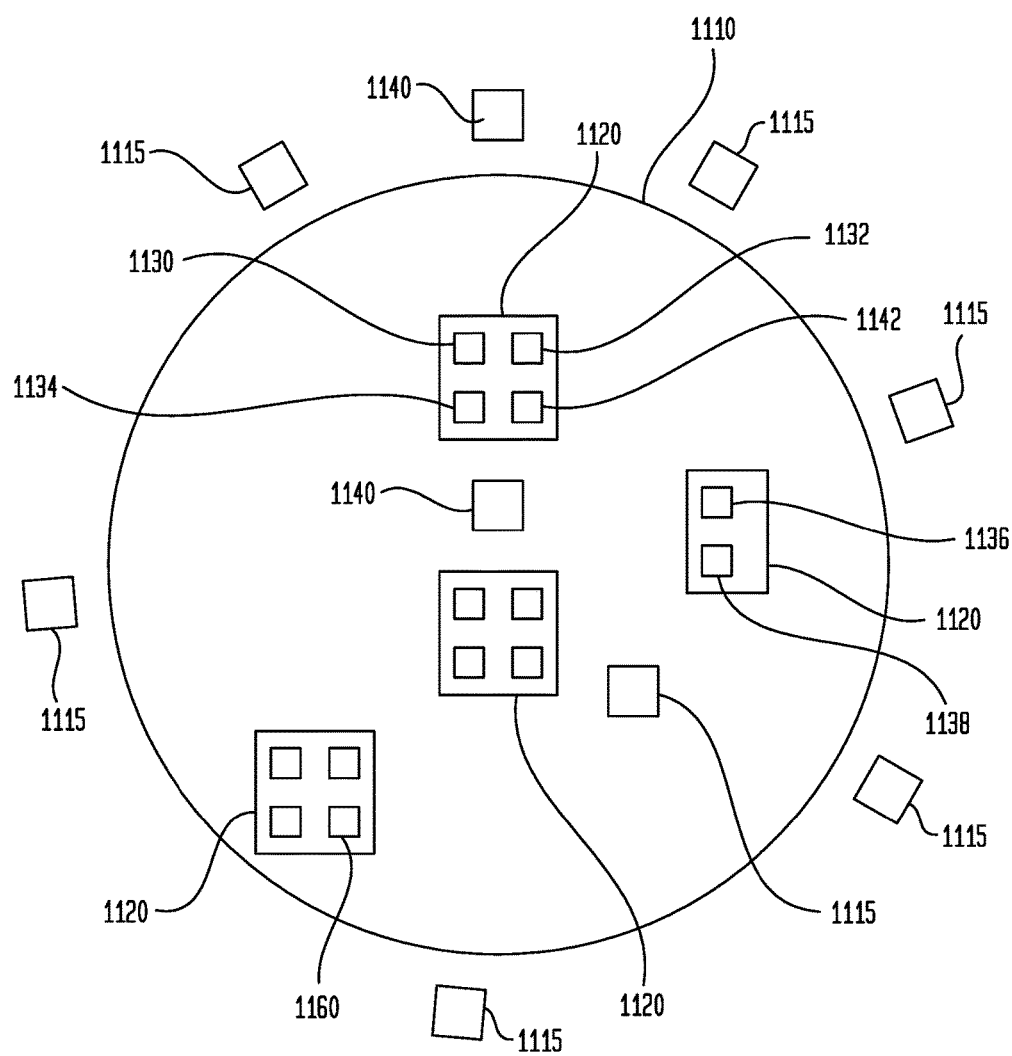
FIG. 11 illustrates an exemplary system configuration in accordance with the principles of the invention.

FIG. 11 illustrates an exemplary system configuration of a system in accordance with the principles of the invention.

Area 1110 includes at least one area (e.g., building) 1120, which includes at least one transmission device 1130 (1132 ... 1138). As discussed previously, transmission device 1130, 1132. 1138 may be grouped such that more than one may be associated with a single user. Further illustrated is at least one transmitter/receiving system 1115 positioned about (i.e., around, within) area 1110. As discussed at least one of the systems 1115 may generate a synchronization signal that is detected by transmission devices 1130...1138. Each of the transmission devices may then provide a response transmission to the synchronization signal in a time slot assigned the transmission device. A processing system (not shown) may identify, correlate and locate a position of the transmission devices.

Concurrently a second receiving system 1140 may be positioned about (i.e., around, within) area 1110. Receiving system 1140 may detect a transmission from a device, such as a (cellular, Wi-Fi, VoIP) telephone 1160. Information regarding the detected transmission may be provided to the processing system, wherein correlation of the detected transmission with the persons determined within the area is performed. Based on the correlation a determination may be made to perform one of: allow continued transmission and not allow continued transmission.

Figure 12:
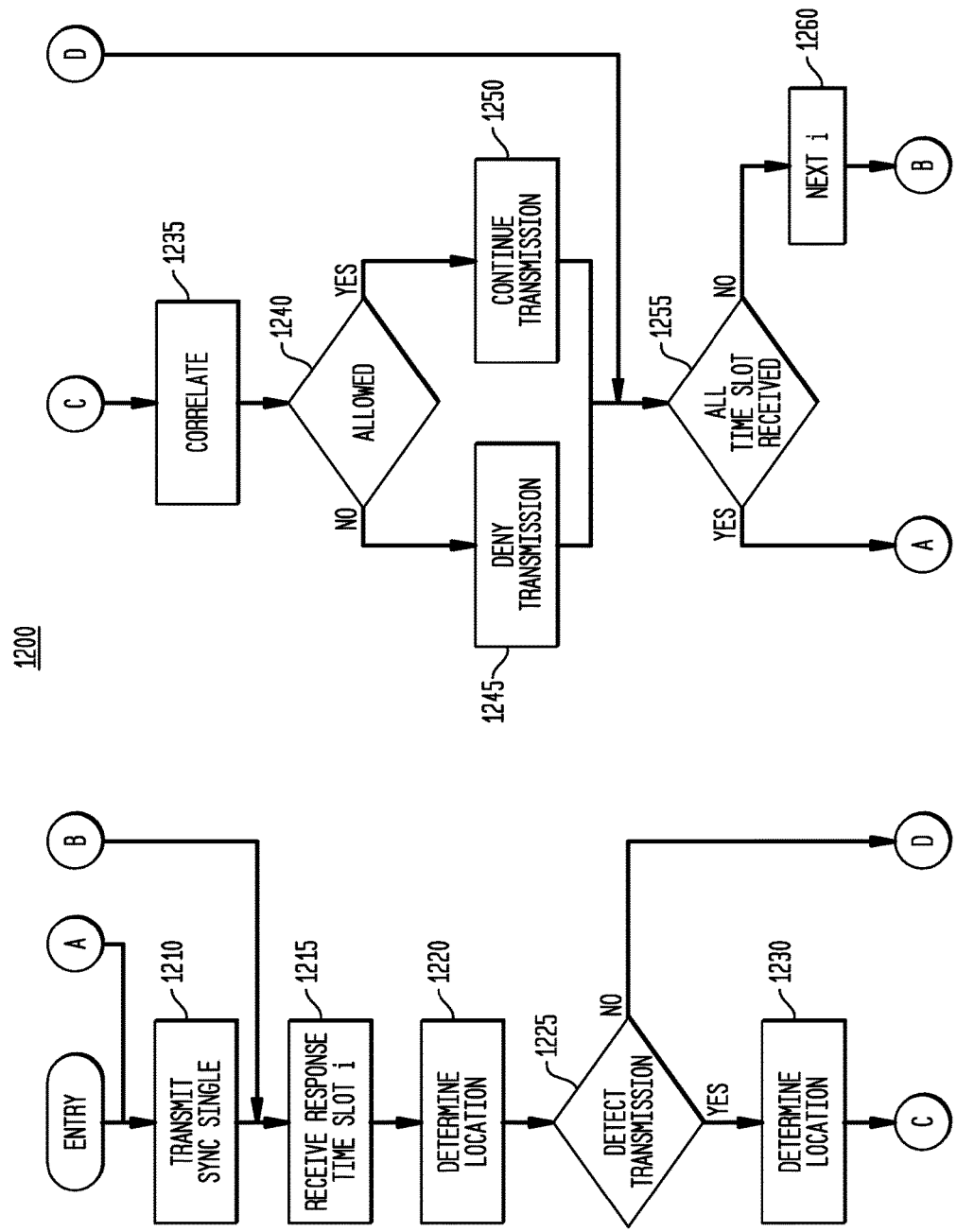
FIG. 12 illustrates a flow chart of an exemplary processing in accordance with the principles of the invention.

FIG. 12 illustrates a flow chart of an exemplary process in accordance with the principles of the invention.

At block 1210 a synchronization signal is transmitted into the designated area. At block 1215, a response to the synchronization signal is received in a time slot allocated or assigned to a specific transmission device. A location of the transmission device is determined based on the received response signal. At block 1225 a determination is made whether an unsolicited transmission is detected. That is, the second receiving system detects a transmission that is a transmission that is not one that is responsive to the synchronization signal. If a transmission is detected, then a location is determined and a correlation of the detected transmission with at least one of the transmission devices determined to be resident within the area is performed. Based on the correlation, a determination is made whether subsequent transmissions are allowed at block 1240. If subsequent transmissions are not allowed then processing continues to block 1245, wherein access to an external network (e.g., a cellular network) is denied. However, if the device associated with the detected transmission is indicated to be allowed processing continues at block 1250 wherein access to the external network is allowed.

Processing continues to block 1255, where a determination is made whether responses have been received from each of the allocated or assigned time slots. If not, then processing continues at block 1260 wherein a next time slot is selected. However, if all time slots are processed, then processing continues to block 1210 to restart the time frame by transmitting a synchronization signal.

In other embodiment, the wireless transmission facility such as a cell phone, PDA or a Wi-Fi appliance, can trigger an action. For customized actions, positive identification and unique identifier is established, wherein when an inmate's wristband (or badge or other transmission device) comes in proximity to an interactive education display system within his cell, the system positively identifies him/her and logs the inmate into the system. This is accomplished via short range communications such as the 802 .xx technology in the wrist band and the education device. Similarly, other forms of Near-Field Communication (NFC) may be used. In another aspect, short range communication such as BLUETOOTH, may be employed. In another embodiment the interaction may use an RFID chip (e.g. active, passive and/or semi-active) that identifies the user. In another embodiment, e.g., a school environment, when a wireless communication device is detected, positive identification is established and the system transmits an action for the interactive display screen informing the school supervisors that one or more students or personnel needs to turn off his cell phone. The action facility further accesses an allowability database and verifies the ability of the transmission facility (e.g., cell phone) to operate within an area. If the transmission facility is not authorized or the wireless communication device (e.g., cell phone) is in an unauthorized area, information may be provided to the user to information the user of the presence of the transmission facility in the unauthorized area. For example, in a hospital setting, the presence of a cell phone, even in standby, may cause harm to the medical devices being used to treat patients), the system may advise the user, by name, of the detection of the cell phone. In this case, the transmission facility provides information to the transmission facility detector of a unique identifier of the transmission facility. As a second example, on a road side, the system may be used to inform a user to slow down as he is speeding or informing the driver he is not allowed to use a cell phone or wireless communication device while driving. In this embodiment, utilizing femto and/or Pico cell and/or transceiver technology action facilities is necessary to provide the specific information to the user. As would be recognized these are just examples of uses of the system illustrated. In addition, the system illustrated may be connected to a data mining database (not shown) to provide customized information to any transmission facility and specific information to a uniquely identified transmission facility.

In an embodiment, a transmission from transmission facility provides a unique identifier which activates a function in an action facility, such as a display that is specifically targeted to the unique identifier. Or the system may provide information specifically designated for the user and the like. Or the system may provide an indicator that the detected wireless transmission facility is prohibited within a designated area or while driving. Or the system may provide information regarding a current location where the wireless transmission facility and/or a potential danger, via a display unit, associated with the current location. The database may be developed to focus information associated with the unique identifier, to meet the mission of the display.

In an embodiment, where it is the intention to run an automated prison to lower the necessary number of personnel and still run a safe and secure facility, the automated facility is controlled by a centralized command and control center and/or a decentralize compartmental command and control center for all functions of the facility including movement of the persons within the facility. In this type of a facility, where complete and accurate identification and location of all personnel is critical, the tracking of individuals, their wireless transmission devices, cell phones, identification units, Walkie-Talkies, and verifying their access to authorized areas, integrating their movement with CCTV (close-circuit TV) and positive facial identification, biometric identification, preventing movement into unauthorized area, developing inclusion zones, creating exclusion zones, ensuring proper count, providing an ability to restrict and/or authorized movement a specific design of the facility and convergence of technology is essential. The technologies discussed herein integrate to the central control to provide the backbone and framework to operate such an automated facility, wherein each staff member and inmate transmission facility will provide for specific identification of each staff member and inmate transmission facility and manage and/or allow specific movement throughout the facility. All movement throughout the facility may be monitored through CCTV and facial recognition. At each egress point, movement may be restricted to individual movement through one area to another area of the facility. For example, daily functions include, meals, medical, programs, court visits, and recreation, may be functions that may be monitored and controlled. As an example of the needs within the automation and the parameters and rules, the system may manage, for example, inmate movement, wherein a Movement list is created, which includes elements such as movement schedule, scheduling recourses, seat allocation programs area classrooms, access to computers, access to a Law library, a time allocation in program and use of facility assets. In addition, the Movement list may further include elements such as enemy exclusion, (i.e., predator wolf/sheep identification and exclusion), conflicts in scheduling of programs such as GED, adult education , culinary arts, and anger management. In another aspect the Movement list may include a Waiting list, an ability for inmates to sign up for classes, a morning schedule and movement, an afternoon schedule and movement, a pre-trail and religious services scheduling. Data mining database techniques and methodologies may be executed to provide for inmate scheduling movement and allocation of assets for the inmate relying on transmission facility authorization. The transmission facility will control access of movement, asset recourses, doors and egress, facility resources and time allocation on facility assets and in which movement takes place. As there is a need for minimum human interaction, display kiosks may display events associated with a specialized schedule for an identified user and inform the inmate of the scheduled events.

In another aspect of the invention, inmates may further wear or possess two transmission detection sensors. Each sensor monitor biometric signs including heart rate, temperature, and the like. With two transmission detection sensors (incorporated in one or more wristbands) medical information (e.g., echo cardiogram) may be generated to provide for health monitoring and for positive identification. The Cell Phone Detection, Control and Position Identification system 100 will include a detector and decoder for all transmission facilities, which will provide positive identification for all transmission facilities, including cell phone and other hand held communication devices, and the specific individual in possession of the transmission facility. All CCTV units will integrate with facial recognition software, all egress points will require biometric checks, such as fingerprint and renal eye scan devices, and this combined with the transmission facility positive identification. The design of the facility is important to provide adequate exercise movement and limited interaction with staff and other inmates. Therefore, a redesign of the facility, to provide services such as decentralized education is important.

In this embodiment, the wireless communication of the sensors will also carry education information and data to each of the inmate cells. Each inmate is equipped with a wireless tablet to take interactive education. The 802.15.4 will provide a dual role of sensor sync and education communication. In embodiment and fully automated wireless communications and personnel and asset tracking, the communication to the sensors will be transmitted via cat 5 cables, which will be placed to communicate with the microprocessor and the 802.11. In this configuration the 802.11 will carry the interactive education and monitoring capability. The microprocessor in that configuration will act as a throughput conduit to isolate high-speed interactive communications between the cat 5 and the 802.11. In this configuration, audio and video, live interaction is capable to perform parole hearings, live interactive education, video visitations, suicide watch, video attorney visits and video court appearances. In this configuration a video server and interactive video switching system will be deployed to handle the interactive communication. As earlier described, the ideal location of sensors may be the water chases to prevent tampering. This also provides the opportunity to have wireless communication with education units within the cells. This wireless communication also provides the ability to as wireless surveillance devices such as cell monitoring into the mix and the like.

In this embodiment where inmate programs, services, commissary, inmate phones, medicine distribution, vending machines, GED education, need to be inmate specific, positive identification is a critical must. To ensure this outcome, the positive identification of each transmission facility is paramount. An example of this embodiment, when an inmate approaches an education display system, the unique identifier of the inmate's transmission facility, provides information to the transmission facility detector of the unique identifier of the transmission facility. A database controls and provides all the applicable information to provide the correct information for each transmission facility. In this case, the transmission facility is a wristband ID bracelet and the like.

Being able to continuously track and positively identify each transmission sensor each is also critical wherein controlling a significant number of transmission facilities (cell phones) may be necessary. As discussed herein, techniques discussed, herein, describe how a cell phone or a transmission facility provides their identification, whether in an active mode and/or an inactive.

In a preferred embodiment of the invention, a Managed Access System utilizes a Software Defined Radio (SDR) transceiver system that incorporates a time domain invention as disclosed herein, and phased array antenna system to create a sensor system incorporated into wearable elements (e.g. wristband) to allow for tracking and monitoring a large number of personal and the location of the personal. The embodiment of the preferred invention utilizes and controls/tracks all wireless communication within an area of interest. The invention allows the tracking and control system of a plurality of transmission systems which may be identified using characteristics such as uplink frequency, downlink frequency, unique Identifier, IMSI, MEID, IMEI, ESN, BCCH, CDMA sub channel, UMTS, LTE, GSM, CDMA, WIFI, and/or time hack, The transmission systems currently tracked include WIFI access points, cell phones, Walkie-Talkies, drone communications, access points, Bluetooth communications, RFID transmission, (active, semi-active), time domain wristband technology. The system's design provides the ability to track and control independently a significantly large number of wireless communications simultaneously, from all known used frequency bands and the like.

In one aspect of the invention tracking and locating drones within or around a secured area may be performed. For example, in one aspect of the invention, communication frequencies within a band(s) associated with drone control may be monitored. In another aspect of the invention, a frequency of the rotation of the drone blades may be detected and analyzed to track drones within or about the secured area. In still another aspect of the invention, sonar and motion detection equipment may be employed about the secure perimeter to detect and identify the presence of a drone within or about the secured area. In still another aspect, CCTV may be employed to visually detect and track drones within or about the secure area. In still other aspects of the invention, SDR and small cross section radar may be used to identify and locate drones. Similarly, audio detection, explosive detection sniffer and ammonia detector may be utilized to detect and track drones within and/or about the secure area. As would be appreciated one or more the above methods may be concurrently employed to provide accurate detection and tracking of drones. In one aspect of the invention, once the drone is located, a manage access system may provide alerts to the appropriate personnel and deploy the countermeasures. Depending on the detection protocol and procedures set up, parameters for determining a response include size of drone, cargo of the drone, a location of drone, the location of drone driver. In one aspect of the invention, the countermeasures options include but is not limited to: 1) jamming the communication frequencies of the drone, 2) deployment of Birds of prey, 3) speadnet trajectory, 4) Trajectory options, 5) Focus EMP trajectory onto the drone, and the like.

In a preferred embodiment of the invention, a programmable radio front-end to receive and transmit specific frequencies, in a well implemented development of the Software Defined Radio (SDR) to be able to implement filtering in real-time to implement spectrum hoping. This embodiment not only allows you to define and program the signal bandwidth, amplitude via a variable gain amplifier, Baseband processing, center frequency, with up to 8 pll digital up/down conversion, front-end FCC defined selectable uplink/downlink bandpass filters, noise floor reduction circuity, in a preferred embodiment of the invention a programmable power amplifier with individualize channel selected multiple bandpass filter(s) is added to the chain to filter out unwanted amplification allowing for a clean high power up to 200 watt LNA . A programmable array antenna which can be set to optimize the phased array data and the like.

In a preferred embodiment of the invention, the system disclosed incorporates a broad spectrum radio transceivers, operating with directional antenna arrays, co-located within a network of sensors. The system controls and monitors the RF environment within the secure perimeter (e.g., a correctional facility. This system would accomplish four major objectives: (1) control all cellular phones, a military facility; (2) deploy Radio Frequency identifications (RFID) tagging applications, (3) accurately detect all active/passive RFID tags; (4) use of advanced features of smart phones, to control and manage movement of personal and/or inmates, to improve a safety and security within the secure perimeter; and (5) monitor the RF spectrum for unauthorized RF signals as a threat to the facility.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A system for managing communication access in a designated area, the system comprising:
    a first system comprising:
        at least one transmitting system configured to transmit a pre-determined signal into the designated area, wherein at least one transmission element is located within the area, said pre-determined signal initiating a time-frame, said time-frame comprising a plurality of time slot windows; and
        at least one receiving system configured to receive a response signal, from a corresponding one of the at least one transmission element, in response to the pre-determined signal, said response signal being received in a time slot window assigned to said corresponding one of the at least one transmission element, wherein each of the at least one transmission element is assigned a corresponding one of said time slot window in which to generate said response signal; and
    a second system comprising:
        at least one receiving system configured to receive a transmission from a transmission device, wherein said transmission being independent of, said response transmissions; and
    a processing system comprising:
        a processor configured to:
            receive information associated with the response signal received from corresponding ones of said at least one transmission element and the transmission from said transmission device;
            associate the transmission device with a selected one of the at least one transmission element;
            associate the selected one of the transmission elements with a corresponding user based on received information within the response signal associated with the selected one of the at least one transmission element; and
            determine an action to be performed based on the received information.

2. The system of claim 1, wherein said pre-determined signal is a synchronization signal for each of the at least one transmitting element.

3. The system of claim 1, wherein said transmission from the transmission device being an unsolicited transmission.

4. The system of claim 1, wherein said action is at least one of: closing a door, sealing a room, deploying an action signal, initiating an alarm, activating an education system, identifying the user, activating an interactive display screen, altering personnel of an action, informing a user to slow down, alerting personal of use of wireless communication near medical devices, generating an indication of allowability of the transmission device based on at least one of: a correlation, a location of the response, a unique identifier of the transmission device, an identification of a user associated with the response, and on an identification of the selected one of the at least one transmission element.

5. The system of claim 4, wherein said correlation is between an identity of the user and an identification of the transmission device.

6. The system of claim 4, wherein said processor is configured to:
    allow subsequent transmission from the transmission device in response to an indication of allowability.

7. The system of claim 4, wherein said correlation is between a location of the user and a location of the transmission device.

8. The system of claim 1, wherein said processor configured to:
    correlate the transmission device with a user.

9. The system of claim 1, wherein said processor is configured to:
    determine a location of selected ones of the at least one transmission elements and a location of the transmission device.

10. The system of claim 8, wherein said correlation is based on at least one of: a location and an identity of the user.

11. The system of claim 1, wherein said time frame is determined between periodic transmissions of the predetermined signal, and said time slot windows being substantially uniformly distributed within the time frame.

12. The system of claim 1, wherein each of the at least one transmission element is assigned a preamble code.

13. The system of claim 12, wherein each of the at least one transmission element is assigned an identification code.

14. The system of claim 13, wherein said identification code is one of: pre-assigned and provided to a corresponding one of the at least one transmission element.

15. The system of claim 12, wherein said response includes at least the preamble code and at least one pulse transmitted a predetermined time after an end of the preamble code.

16. The system of claim 1, wherein said received information comprises at least one of: an alarm information, a notification information, a movement information, a biometric information, a scheduling request information, a medical information, a positive identification, a unique identifier information, an association between people information, a location information, a positive identification of other wireless communication in the area information, an asset tracking information, an education information, an audio information, a video information, a live interactive education information, a video visitations information, a suicide watch information, a video attorney visits information, a video court appearances information, an egress notification, an emergency notification, an alarm alert, a panic button, an audio communication capability, an altitude and attitude indication, a monitoring information, and a tracking information.

17. The system of claim 1, wherein said transmission from the transmission device represents an occurrence of an event.

18. The system of claim 17, wherein said event represents an emergency condition.

19. The system of claim 17, said processor configured to: provide information of a location of the event.

20. The system of claim 1, wherein said action comprises: informing at least one person of at least one of: a user of the transmission device, a location of said user and a location of the transmission device.

21. The system of claim 1, wherein said transmission is received in a frequency band associated with at least one of: cellular communication, walkie-talkie communication, Wi-Fi communication, a transceiver technology communication and a VoIP communication.

* * * * *